(12) United States Patent
Kaneko et al.

(10) Patent No.: US 11,017,805 B2
(45) Date of Patent: May 25, 2021

(54) MAGNETIC TAPE RECORDING DEVICE HAVING DUAL READING TRANSDUCERS

(71) Applicant: FUJIFILM Corporation, Tokyo (JP)

(72) Inventors: Tetsuya Kaneko, Kanagawa (JP); Atsushi Musha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/795,800

(22) Filed: Feb. 20, 2020

(65) Prior Publication Data

US 2020/0273489 A1 Aug. 27, 2020

(30) Foreign Application Priority Data

Feb. 26, 2019 (JP) .............................. JP2019-033105

(51) Int. Cl.
| | |
|---|---|
| *G11B 5/588* | (2006.01) |
| *G11B 5/55* | (2006.01) |
| *G11B 5/596* | (2006.01) |
| *G11B 5/008* | (2006.01) |
| *G11B 5/584* | (2006.01) |

(52) U.S. Cl.
CPC .......... *G11B 5/588* (2013.01); *G11B 5/00826* (2013.01); *G11B 5/5508* (2013.01); *G11B 5/59638* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 7,755,863 B2 | 7/2010 | Neumann et al. | |
| 9,997,184 B1* | 6/2018 | Bui | G11B 5/5926 |
| 10,629,228 B2* | 4/2020 | Kaneko | G11B 5/00813 |
| 10,643,646 B2* | 5/2020 | Kasada | G11B 5/70678 |
| 10,643,647 B2* | 5/2020 | Kasada | G11B 5/00817 |
| 10,679,655 B2* | 6/2020 | Ozawa | G11B 5/584 |
| 10,692,528 B2* | 6/2020 | Ozawa | G11B 20/10046 |
| 10,706,875 B2* | 7/2020 | Kasada | G11B 5/5508 |
| 10,755,735 B2* | 8/2020 | Ozawa | G11B 5/59677 |
| 10,755,741 B2* | 8/2020 | Ozawa | G11B 5/00817 |
| 2005/0231845 A1* | 10/2005 | Shirouzu | G11B 20/00695 360/48 |

(Continued)

FOREIGN PATENT DOCUMENTS

| | | |
|---|---|---|
| JP | 2008-282501 A | 11/2008 |
| JP | 2011-134372 A | 7/2011 |
| JP | 2016-110680 A | 6/2016 |

*Primary Examiner* — Tan X Dinh
(74) *Attorney, Agent, or Firm* — Sughrue Mion, PLLC

(57) ABSTRACT

A magnetic tape reading apparatus comprises an acquisition unit that acquires information on linearity of a servo pattern to be recorded on a servo band of a magnetic tape, a reading element unit in which at least two reading elements each of which reads data from a specific track region included in the magnetic tape are disposed, a servo reading element that reads the servo pattern, a control unit that performs control of positioning the reading element unit, a derivation unit that derives a deviation amount, and an extraction unit that extracts data recorded on the reading target track by performing a waveform equalization process on each reading result for the reading elements in accordance with the deviation amount.

14 Claims, 22 Drawing Sheets

(56) References Cited

U.S. PATENT DOCUMENTS

| | | | |
|---|---|---|---|
| 2008/0278844 A1* | 11/2008 | Kawakami | G11B 5/584 360/77.12 |
| 2010/0046108 A1* | 2/2010 | Anna | G11B 15/689 360/53 |
| 2013/0279041 A1* | 10/2013 | Holmberg | G11B 5/00813 360/75 |
| 2019/0074031 A1* | 3/2019 | Akano | G11B 5/00813 |
| 2020/0251134 A1* | 8/2020 | Kasada | G11B 5/7022 |
| 2020/0251135 A1* | 8/2020 | Kasada | G11B 5/78 |
| 2020/0251136 A1* | 8/2020 | Ozawa | G11B 5/584 |
| 2020/0251138 A1* | 8/2020 | Ozawa | G11B 5/00813 |
| 2020/0251139 A1* | 8/2020 | Kasada | G11B 5/70 |
| 2020/0251140 A1* | 8/2020 | Ozawa | G11B 23/502 |
| 2020/0273490 A1* | 8/2020 | Naoi | G11B 5/00817 |

\* cited by examiner

PRIOR ART

MAGNETIC TAPE RECORDING DEVICE HAVING DUAL READING TRANSDUCERS

CROSS-REFERENCE TO RELATED APPLICATIONS

This application claims priority under 35 USC 119 from Japanese Patent Application No. 2019-033105 filed Feb. 26, 2019, the disclosure of which is incorporated by reference herein.

BACKGROUND

1. Technical Field

The present invention relates to a magnetic tape reading apparatus, magnetic tape cartridge, and magnetic tape reading method.

2. Related Art

U.S. Pat. No. 7,755,863B2 discloses a reading head in which a plurality of reading elements for a magnetic storage medium read a plurality of tracks at the same time from a storage medium by using a plurality of active regions.

JP2016-110680A discloses a magnetic head comprising a plurality of reproducing elements each including a first magnetic layer in which a magnetization direction is fixed, and a second magnetic layer which is provided to face the first magnetic layer with an insulating layer interposed therebetween and in which a magnetization direction is not fixed. In the magnetic head disclosed in JP2016-110680A, in at least two reproducing elements among the plurality of reproducing elements, the first magnetic layer and the second magnetic layer are disposed to across a certain straight line and magnetization directions of first magnetic bodies are different from each other.

JP2011-134372A discloses a magnetic signal reproducing apparatus comprising a reproducing head, a position deviation amount calculation unit, and an output value calculation unit. In the magnetic signal reproducing apparatus disclosed in JP2011-134372A, the reproducing head includes a plurality of reproducing elements disposed in a width direction of a track on a disk, and reproduces a burst signal recorded on each track with the plurality of reproducing elements positioned on the tracks. The reproducing head reproduces data signals recorded on each of a plurality of data tracks formed in a width direction of a first track with two or more reproducing elements positioned on the data tracks at the same time.

In the magnetic signal reproducing apparatus disclosed in JP2011-134372A, the position deviation amount calculation unit calculates a position deviation amount of a reproducing head with respect to the center of the track during the signal reproducing, from the burst signal recorded on the track. In the magnetic signal reproducing apparatus disclosed in JP2011-134372A, the output value calculation unit determines a positional relationship between two or more reproducing elements positioned on the data track and the data track, from a position error corresponding to the position deviation amount of the reproducing head. The output value calculation unit performs weighting composite of a data signal reproduced at the same time for each data track based on the determination result, and calculates an output value of the data track.

JP2008-282501A discloses a reproducing apparatus based on helical scan. In the reproducing apparatus disclosed in JP2008-282501A, a channel matrix estimation unit estimates a channel matrix variable in a section of a data, based on a plurality of channel matrixes obtained as a result of the channel estimation operation from a reproducing signal of a separation pattern in a plurality of preambles continuing with the data interposed therebetween. A signal separation operation unit separates a reproducing signal for each track from a reproducing signal for 1 unit, using the variable channel matrix estimated by the channel matrix estimation unit.

SUMMARY

However, U.S. Pat. No. 7,755,863B2 does not disclose a specific activation method regarding the reading head. In addition, both technologies disclosed in JP2016-110680A and JP2011-134372A are technologies based on the reading of data from a disk medium, and a relative position between a plurality of reproducing elements and the track center is changed between an inner diameter portion and an outer diameter portion of the disk medium. Accordingly, it is difficult to dispose the plurality of the reproducing elements so as not to cause the deviation of each thereof with respect to all tracks. In addition, in the technology disclosed in JP2011-134372A, a servo pattern and data are written on the same track, and accordingly, it is difficult to properly read the data, in a case where sharp vibration occurs. In addition, the technology disclosed in JP2008-282501A is based on helical scan, and it is difficult to synchronously perform the reading of a servo signal from a servo pattern and the reading of data from a reading target track as a linear scanning method.

However, in an example shown in FIG. 31, an elongated reading head 200 comprises a plurality of reading elements 202 along a longitudinal direction. In a magnetic tape 204, a plurality of tracks 206 are formed. The reading head 200 is disposed so that the longitudinal direction coincides with a width direction of the magnetic tape 204. In addition, each of the plurality of reading elements 202 is allocated for each of the plurality of tracks 206 in a one-to-one relation, and reads data from the track 206 at a position faced.

However, the magnetic tape 204 expands and contracts due to time elapse, an environment, a change of a tension, and the like. In a case where the magnetic tape expands and contracts in a width direction of the magnetic tape 204, the center of the reading elements 202 disposed on both ends in the longitudinal direction in the reading head 200 deviates from the center of the track 206. In a case where the magnetic tape 204 is modified due to the expansion and contraction in a width direction, particularly, the reading elements 202 closer to both ends of the reading head 200, among the plurality of reading elements 202, receive a greater effect of off-track. In order to reduce the effect of the off-track, for example, a method of applying a surplus width to the width of the track 206 is considered, but as the width of the track 206 increases, a recording density of data in the magnetic tape 204 decreases.

In addition, as shown in FIG. 32 as an example, a servo element 208 is provided in the reading head 200. A servo pattern which is applied to the magnetic tape 204 in advance along a running direction of the magnetic tape 204 is read by the servo element 208. A control device (not shown) specifies that which position on the magnetic tape 204 the reading element 202 runs on, at regular time intervals, from the servo signal obtained by reading the servo pattern by the servo element 208. Accordingly, a position error signal (PES) in a width direction of the magnetic tape 204 is detected by the control device.

As described above, in a case where the control device specifies the running position of the reading element 202, a feedback control is performed with respect to an actuator (not shown) for the reading head by the control device based on the specified running position, and accordingly, the tracking of the magnetic tape 204 in the width direction is realized.

However, although the tracking is performed, sharp vibration, a high-frequency component of jitter, and the like are factors of an increase in PES, and this causes a deterioration in reliability of data read from a reading target track.

On the other hand, the linear servo pattern to be recorded on the magnetic tape may not be formed linearly on the magnetic tape. In this case, the accuracy of positioning of the reading head is lowered, and as a result, the reliability of the data read from the reading target track is lowered.

An object of one embodiment of the present invention is to provide a magnetic tape reading apparatus, a magnetic tape cartridge, and a magnetic tape reading method capable of suppressing a deterioration in reliability of data read from a reading target track by a linear scanning method, compared to a case where data is read only by a single reading element from a reading target track by a linear scanning method.

In order to achieve the object described above, a magnetic tape reading apparatus according to a first aspect of the invention comprises an acquisition unit that acquires information on linearity of a servo pattern to be recorded on a servo band of a magnetic tape included in a magnetic tape cartridge from the magnetic tape cartridge, a reading element unit in which at least two reading elements each of which reads data by a linear scanning method from a specific track region including a reading target track in a track region included in the magnetic tape are disposed in a state of being adjacent to each other, a servo reading element that reads the servo pattern, a control unit that performs control of positioning the reading element unit by using a read signal of the servo pattern read by the servo reading element and the information on the linearity acquired by the acquisition unit, a derivation unit that derives a deviation amount between positions of the magnetic tape and the reading element unit by using the read signal of the servo pattern in a state where the control unit performs control, and an extraction unit that extracts data recorded on the reading target track from a reading result by performing a waveform equalization process to each reading result for the reading elements in accordance with the deviation amount derived by the derivation unit.

In order to achieve the object described above, a magnetic tape reading apparatus according to a second aspect of the invention comprises an acquisition unit that acquires information on linearity of a servo pattern to be recorded on a servo band of a magnetic tape included in a magnetic tape cartridge from the magnetic tape cartridge, a reading element unit in which at least two reading elements each of which reads data by a linear scanning method from a specific track region including a reading target track in a track region included in the magnetic tape are disposed in a state of being adjacent to each other, a servo reading element that reads the servo pattern, a control unit that performs control of positioning the reading element unit by using a read signal of the servo pattern read by the servo reading element, a derivation unit that derives a deviation amount between positions of the magnetic tape and the reading element unit by using the read signal of the servo pattern and the information on the linearity acquired by the acquisition unit in a state where the control unit performs control, and an extraction unit that extracts data recorded on the reading target track from a reading result by performing a waveform equalization process on each reading result for the reading elements in accordance with the deviation amount derived by the derivation unit.

According to a third aspect of the invention, in the magnetic tape reading apparatus of the first aspect, the derivation unit derives the deviation amount by using the information on the linearity in addition to the read signal of the servo pattern.

According to a fourth aspect of the invention, in the magnetic tape reading apparatus of the second aspect, the control unit performs control of positioning the reading element unit by using the information on the linearity in addition to the read signal of the servo pattern.

In the magnetic tape reading apparatus according to a fifth aspect of the invention, the specific track region is a region including the reading target track and an adjacent track being adjacent to the reading target track, and in a case where a positional relationship with the magnetic tape is changed, at least one reading element among the at least two reading elements straddles over both the reading target track and the adjacent track, and at least the other one reading element falls within the reading target track.

In the magnetic tape reading apparatus according to a sixth aspect of the invention, parts of the at least two reading elements overlap each other in a running direction of the magnetic tape.

In the magnetic tape reading apparatus according to a seventh aspect of the invention, the specific track region is a region including the reading target track and an adjacent track being adjacent to the reading target track, and in a case where a positional relationship with the magnetic tape is changed, the at least two reading elements straddle over both the reading target track and the adjacent track.

In the magnetic tape reading apparatus according to an eighth aspect of the invention, a tap coefficient used in the waveform equalization process is determined in accordance with the deviation amount.

In the magnetic tape reading apparatus according to a ninth aspect of the invention, the extraction unit derives the tap coefficient based on the deviation amount by using a table in which the tap coefficient and the deviation amount are associated with each other.

In the magnetic tape reading apparatus according to a tenth aspect of the invention, for each of the at least two reading elements, a ratio between an overlapping region with the reading target track and an overlapping region with an adjacent track being adjacent to the reading target track is specified based on the deviation amount, and the tap coefficient is determined in accordance with the specified ratio.

In the magnetic tape reading apparatus according to an eleventh aspect of the invention, the information on the linearity of the servo pattern is information on linearity of a servo recording element of a servo recording head that records the servo pattern on the magnetic tape.

In the magnetic tape reading apparatus according to a twelfth aspect of the invention, the information on the linearity of the servo pattern is recorded in a form of table or arithmetic expression.

In order to achieve the object described above, a magnetic tape cartridge according to a thirteenth aspect of the invention comprises a magnetic tape that has a plurality of servo bands on which a servo pattern is recorded and a track region which is provided between the servo bands and on which data is recorded, and in which each reading element unit having at least two reading elements disposed in a state of being adjacent to each other reads the data by a linear scanning method from a specific track region including a reading target track in the track region, and a recording medium on which information on linearity of the servo pattern is recorded.

In order to achieve the object described above, a magnetic tape reading method according to a fourteenth aspect of the invention is a method by using a reading element unit in which at least two reading elements are disposed in a state of being adjacent to each other, the method comprising acquiring information, recorded on a recording medium included in a magnetic tape cartridge, on linearity of a servo pattern to be recorded on a servo band of a magnetic tape included in the magnetic tape cartridge by an acquisition unit, reading the servo pattern by a servo reading element, positioning the reading element unit by using a read signal of the servo pattern and the information on the linearity by a control unit, deriving a deviation amount between positions of the magnetic tape and the reading element unit by using the read signal of the servo pattern by a derivation unit in a state where the control unit performs control of positioning, reading data from a specific track region including a reading target track in a track region included in the magnetic tape by a linear scanning method by each of the at least two reading elements, and extracting data recorded on the reading target track from a reading result by an extraction unit by performing a waveform equalization process on each reading result for the reading elements in accordance with the derived deviation amount.

In order to achieve the object described above, a magnetic tape reading method according to a fifteenth aspect of the invention is a method by using a reading element unit in which at least two reading elements are disposed in a state of being adjacent to each other, the method comprising acquiring information, recorded on a recording medium included in a magnetic tape cartridge, on linearity of a servo pattern to be recorded on a servo band of a magnetic tape included in the magnetic tape cartridge by an acquisition unit, reading the servo pattern by a servo reading element, positioning the reading element unit by using a read signal of the servo pattern by a control unit, deriving a deviation amount between positions of the magnetic tape and the reading element unit by using the read signal of the servo pattern and the information on the linearity by a derivation unit in a state where the control unit performs control of positioning, reading data from a specific track region including a reading target track in a track region included in the magnetic tape by a linear scanning method by each of the at least two reading elements, and extracting data recorded on the reading target track from a reading result by an extraction unit by performing a waveform equalization process on each reading result for the reading elements in accordance with the derived deviation amount.

According to one embodiment of the present invention, provided are a magnetic tape reading apparatus, a magnetic tape cartridge, and a magnetic tape reading method capable of suppressing deterioration in reliability of data read from a reading target track by a linear scanning method, compared to a case where data is read only by a single reading element from the reading target track by the linear scanning method.

BRIEF DESCRIPTION OF THE DRAWINGS

Exemplary embodiments of the present invention will be described in detail based on the following figures, wherein.

DETAILED DESCRIPTION

Hereinafter, an example of the embodiment of a magnetic tape reading apparatus according to a technology of this disclosure will be described with reference to the accompanying drawings.

Figure 1:
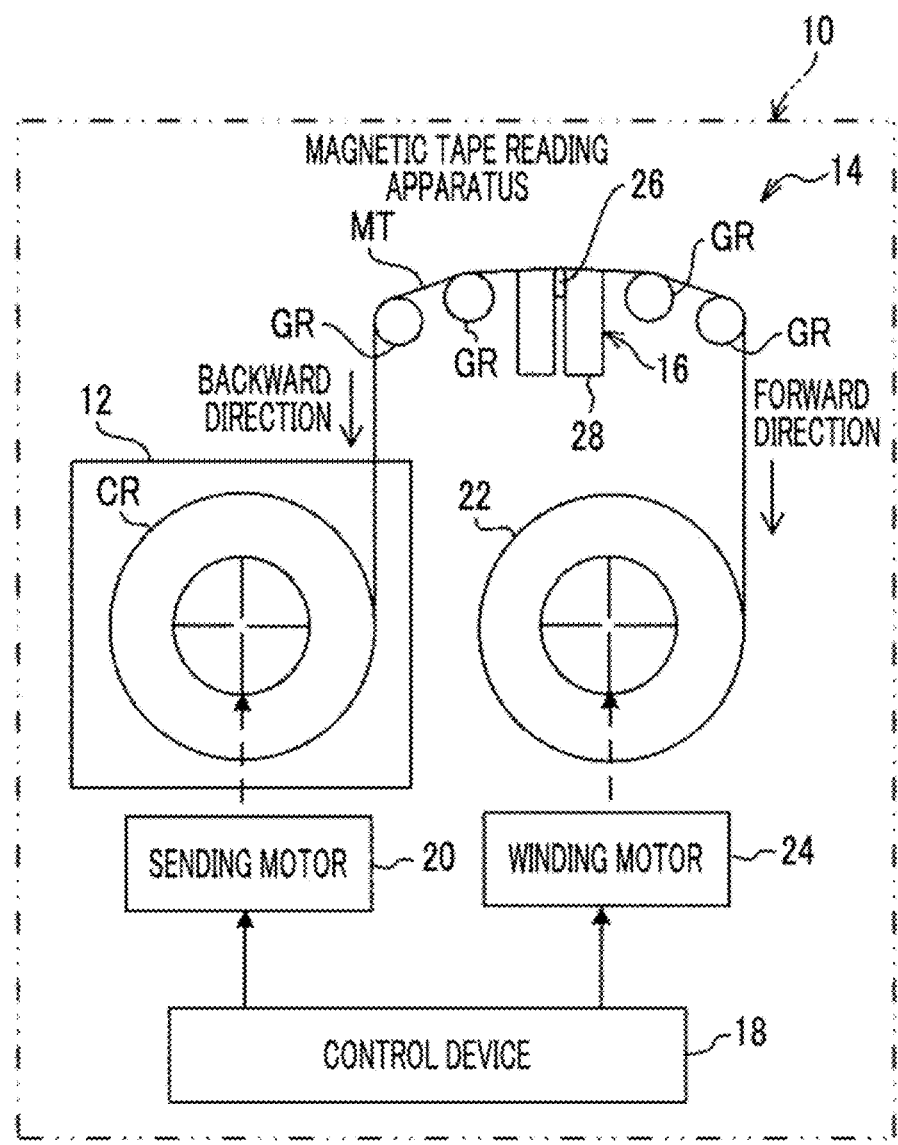
FIG. 1 is a schematic configuration view showing an example of the entire configuration of a magnetic tape reading apparatus according to the embodiment

As shown in FIG. 1 as an example, a magnetic tape reading apparatus 10 comprises a magnetic tape cartridge 12, a transportation device 14, a reading head 16, and a control device 18.

The magnetic tape reading apparatus 10 is an apparatus which extracts a magnetic tape MT from the magnetic tape cartridge 12 and reads data from the extracted magnetic tape MT by using the reading head 16 by a linear scanning method. In the embodiment of the present disclosure, the reading of data indicates the reproducing of data. Although the magnetic tape reading apparatus 10 can record and read data, in the present embodiment, the configuration relating to data reading will be mainly described and the apparatus is referred to as a "magnetic tape reading apparatus" for convenience.

The control device 18 controls the entire magnetic tape reading apparatus 10. In the embodiment of the present disclosure, the control device 18 is realized with an application specific integrated circuit (ASIC), but the technology of the present disclosure is not limited thereto. For example, the control device 18 may be realized with a field-programmable gate array (FPGA). In addition, the control device 18 may be realized with a computer including a central processing unit (CPU), a read only memory (ROM), and a random access memory (RAM). Further, the control device 18 may be realized with a combination of two or more of AISC, FPGA, and the computer.

The transportation device 14 is a device which selectively transports the magnetic tape MT in a forward direction and a backward direction, and comprises a sending motor 20, a winding reel 22, a winding motor 24, a plurality of guide rollers GR, and the control device 18.

A cartridge reel CR is provided in the magnetic tape cartridge 12. The magnetic tape MT is wound around the cartridge reel CR. The sending motor 20 causes the cartridge reel CR in the magnetic tape cartridge 12 to be rotatably driven under the control of the control device 18. The control device 18 controls the sending motor 20 to control a rotation direction, a rotation rate, a rotation torque, and the like of the cartridge reel CR.

In a case of winding the magnetic tape MT around the winding reel 22, the control device 18 rotates the sending motor 20 so that the magnetic tape MT runs in a forward direction. The rotation rate, the rotation torque, and the like of the sending motor 20 are adjusted in accordance with a speed of the magnetic tape MT wound around the winding reel 22.

The winding motor 24 causes the winding reel 22 to be rotatably driven under the control of the control device 18. The control device 18 controls the winding motor 24 to control a rotation direction, a rotation rate, a rotation torque, and the like of the winding reel 22.

In a case of winding the magnetic tape MT around the winding reel 22, the control device 18 rotates the winding motor 24 so that the magnetic tape MT runs in the forward direction. The rotation rate, the rotation torque, and the like of the winding motor 24 are adjusted in accordance with a speed of the magnetic tape MT wound around the winding reel 22.

By adjusting the rotation rate, the rotation torque, and the like of each of the sending motor 20 and the winding motor 24 as described above, a tension in a predetermined range is applied to the magnetic tape MT. Here, the predetermined range indicates a range of a tension obtained from a computer simulation and/or a test performed with a real machine, as a range of a tension in which data can be read from the magnetic tape MT by the reading head 16, for example.

In a case of rewinding the magnetic tape MT to the cartridge reel CR, the control device 18 rotates the sending motor 20 and the winding motor 24 so that the magnetic tape MT runs in the backward direction.

In the embodiment of the present disclosure, the tension of the magnetic tape MT is controlled by controlling the rotation rate, the rotation torque, and the like of the sending motor 20 and the winding motor 24, but the technology of the present disclosure is not limited thereto. For example, the tension of the magnetic tape MT may be controlled by using a dancer roller, or may be controlled by drawing the magnetic tape MT to a vacuum chamber.

Each of the plurality of guide rollers GR is a roller guiding the magnetic tape MT. A running path of the magnetic tape MT is determined by separately disposing the plurality of guide rollers GR on positions straddling over the reading head 16 between the magnetic tape cartridge 12 and the winding reel 22.

The reading head 16 comprises a reading unit 26 and a holder 28. The reading unit 26 is held by the holder 28 so as to come into contact with the magnetic tape MT during the running.

Figure 2:
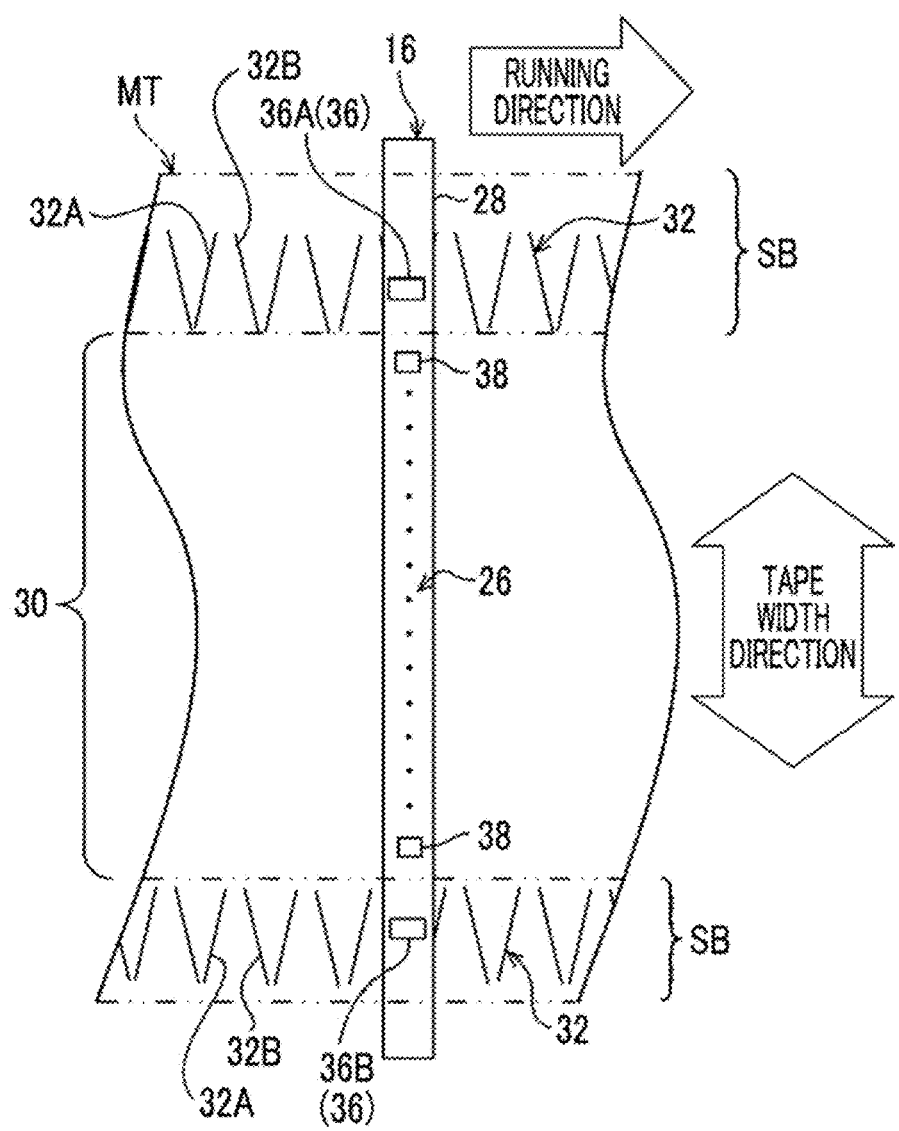
FIG. 2 is a schematic plan view showing an example of a schematic configuration in a plan view of a reading head and a magnetic tape included in the magnetic tape reading apparatus according to the embodiment.

As shown in FIG. 2 as an example, the magnetic tape MT comprises a track region 30 and a servo band SB on which a servo pattern 32 is recorded. The servo pattern 32 is a pattern used for detection of the position of the reading head 16 on the magnetic tape MT. The servo pattern 32 is a pattern in which a first diagonal line 32A at a first predetermined angle (for example, 95 degrees) and a second diagonal line 32B at a second predetermined angle (for example, 85 degrees) are alternately disposed on both ends of the track region 30 in a tape width direction at a constant pitch along a running direction of the magnetic tape MT. The "tape width direction" here indicates a width direction of the magnetic tape MT. Hereinafter, for convenience of description, the "running direction of the magnetic tape MT" is simply referred to as the "running direction".

The track region 30 is a region where data which is a reading target is written. A plurality of track regions 30 are provided along the width direction of the magnetic tape MT, and the servo bands SB are provided at both ends of each track region 30 in the tape width direction.

The reading unit 26 comprises a servo reading element pair 36 and a plurality of reading element units 38. The holder 28 is formed to be elongated in the tape width direction, and a total length of the holder 28 in the longitudinal direction is longer than the width of the magnetic tape MT. The servo reading element pairs 36 are disposed on both ends of the holder 28 in the longitudinal direction, and the plurality of reading element units 38 are disposed on the center of the holder 28 in the longitudinal direction.

The servo reading element pair 36 comprises servo reading elements 36A and 36B. The servo reading element 36A is disposed on a position facing the servo pattern 32 on one end of the magnetic tape MT in the tape width direction, and the servo reading element 36B is disposed on a position facing the servo pattern 32 on the other end of the magnetic tape MT in the tape width direction.

In the holder 28, the plurality of reading element units 38 are disposed between the servo reading element 36A and the servo reading element 36B along the tape width direction. The track region 30 comprises the plurality of tracks at regular intervals in the tape width direction, and in a default state of the magnetic tape reading apparatus 10, each of the plurality of reading element units 38 is disposed to face each track in the track region 30.

Thus, since the reading unit 26 and the magnetic tape MT relatively move linearly along the longitudinal direction of the magnetic tape MT, the data of each track in the track region 30 is read by each reading element unit 38 at the corresponding position among the plurality of reading element units 38 by the linear scanning method. In addition, in the linear scanning method, the servo patterns 32 are read by the servo reading element pair 36 synchronously with the reading operation of the reading element units 38. That is, in the linear scanning method according to the embodiment of the present disclosure, the reading with respect to the magnetic tape MT is performed in parallel by the plurality of reading element units 38 and the servo reading element pair 36.

Here, "each track in the track region 30" here indicates a track included in "each of a plurality of specific track region including each reading target track in the track region included in the magnetic tape" in the present disclosure.

The default state of the magnetic tape reading apparatus 10 indicates a state where the magnetic tape MT is not deformed and a positional relationship between the magnetic tape MT head the reading head 16 is a correct positional relationship. Here, the correct positional relationship indicates a positional relationship in which the center of the magnetic tape MT in the tape width direction and the center of the reading head 16 in the longitudinal direction coincide with each other.

Figure 3:
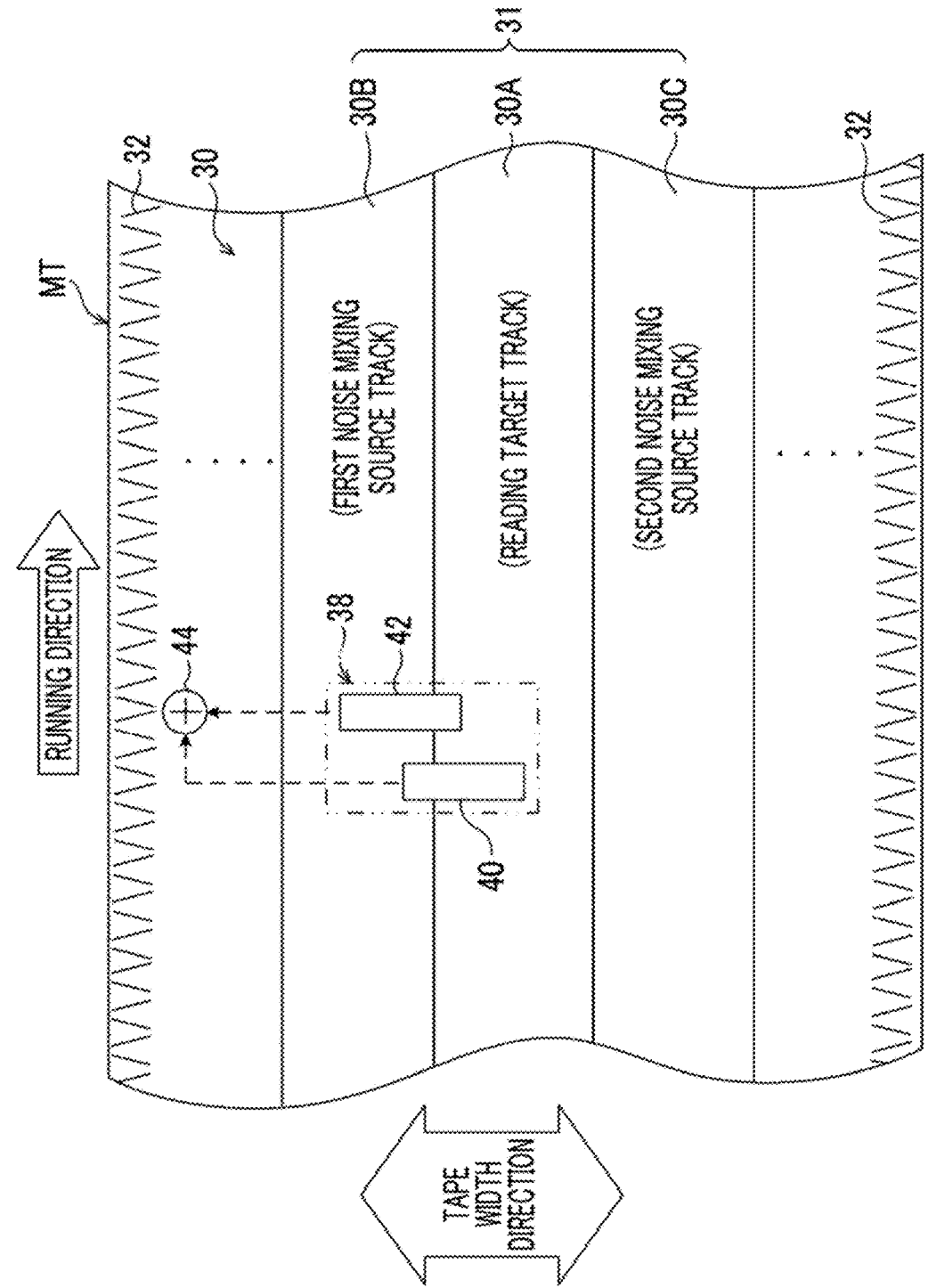
FIG. 3 is a schematic plan view showing an example of a schematic configuration in a plan view of a reading element unit and a magnetic tape according to the embodiment.

Since each of the plurality of reading element unit 38 has the same configuration, the description will be performed using one of the plurality of reading element unit 38 as an example, hereinafter, for convenience of description. As shown in FIG. 3 as an example, the reading element unit 38 comprises one pair of reading elements. In the example shown in FIG. 3, one pair of reading elements indicates a first reading element 40 and a second reading element 42. Each of the first reading element 40 and the second reading element 42 reads data from a specific track region 31 including a reading target track 30A in the track region 30.

In the example shown in FIG. 3, for convenience of description, one specific track region 31 is shown, but in practice, in the track region 30, a plurality of specific track regions 31 are present, and the reading target track 30A is included in each specific track region 31. The reading element unit 38 is allocated to each of the plurality of specific track regions 31 in a one-to-one manner. Specifically, the reading element unit 38 is allocated to the reading target track 30A in each of the plurality of specific track regions 31 in a one-to-one manner.

The specific track region 31 indicates three adjacent tracks. A first track among the three adjacent tracks is the reading target track 30A in the track region 30. A second track among the three adjacent tracks is a first noise mixing source track 30B which is one adjacent track adjacent to the reading target track 30A. A third track among the three adjacent tracks is a second noise mixing source track 30C which is one adjacent track adjacent to the reading target track 30A. The reading target track 30A is a track at a position facing the reading element unit 38 in the track region 30. That is, the reading target track 30A indicates a track which is a reading target of data by the reading element unit 38.

The first noise mixing source track 30B is a track which is adjacent to the reading target track 30A on one side in the tape width direction and is a mixing source of noise mixed to data read from the reading target track 30A. The second noise mixing source track 30C is a track which is adjacent to the reading target track 30A on the other side in the tape width direction and is a mixing source of noise mixed to data read from the reading target track 30A. Hereinafter, for convenience of description, in a case where it is not necessary to describe the first noise mixing source track 30B and the second noise mixing source track 30C separately, these are referred to as the "adjacent track" without reference numerals.

In the embodiment of the present disclosure, in the track region 30, the plurality of specific track regions 31 are disposed at regular intervals in the tape width direction. For example, in the track region 30, 32 specific track regions 31 are disposed at regular intervals in the tape width direction, and the reading element unit 38 is allocated to each specific track region 31 in a one-to-one manner.

The first reading element 40 and the second reading element 42 are disposed at positions parts of which overlap each other in the running direction, in a state of being adjacent in the running direction. In a default state of the magnetic tape reading apparatus 10, the first reading element 40 is disposed at a position straddling over the reading target track 30A and the first noise mixing source track 30B. In a default state of the magnetic tape reading apparatus 10, the second reading element 42 is disposed at a position straddling over the reading target track 30A and the first noise mixing source track 30B.

In a default state of the magnetic tape reading apparatus 10, the area of a portion of the first reading element 40 facing the reading target track 30A is greater than the area of a portion of the first reading element 40 facing the first noise mixing source track 30B, in a plan view. Meanwhile, in a default state of the magnetic tape reading apparatus 10, the area of a portion of the second reading element 42 facing the first noise mixing source track 30B is greater than the area of a portion of the first reading element 40 facing the reading target track 30A, in a plan view.

The data read by the first reading element 40 is subjected to a waveform equalization process by a first equalizer 70 described below (see FIG. 22). The data read by the second reading element 42 is subjected to a waveform equalization process by a second equalizer 72 described below (see FIG. 22). Data items obtained by performing the waveform equalization process by the first equalizer 70 and the second equalizer 72 are added by an adder 44 and composed.

In the embodiment of the present disclosure, the aspect in which the reading element unit 38 includes the first reading element 40 and the second reading element 42 is described, but for example, even in a case where only one reading element (hereinafter, also referred to as a single reading element) among a pair of reading elements may be used, a signal corresponding to a reproducing signal (a read signal) obtained from the reading element unit 38 is obtained.

Figure 23:
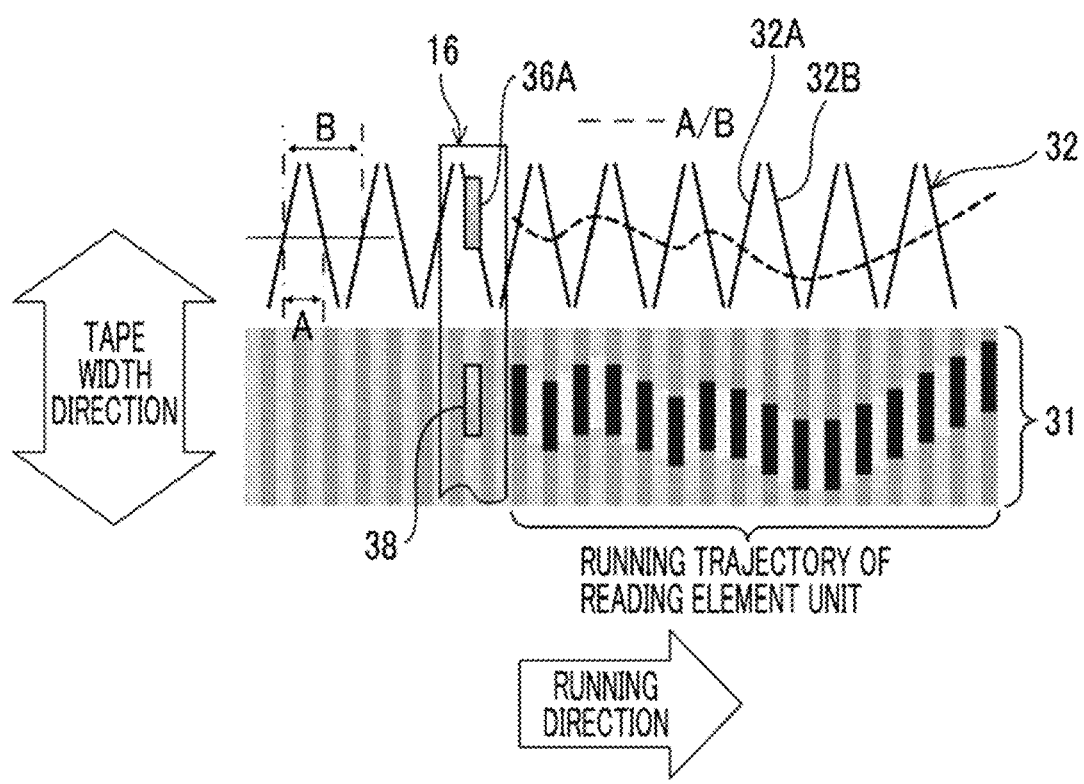
FIG. 23 is a conceptual view provided for description of a method of calculating a deviation amount.

In this case, for example, as shown in FIG. 23, the reproducing signal obtained from the single reading element is allocated to a plane position on a track calculated from a servo signal obtained by the servo reading element pair 36 synchronously with the reproducing signal. By repeating this operation while moving the single reading element in the tape width direction, a two-dimensional image of the reproducing signal (hereinafter, simply referred to as a "two-dimensional image") is obtained. Here, a reproducing signal configuring the two-dimensional image or a part of the two-dimensional image (for example, the reproducing signal corresponding to the position of each of the plurality of tracks) is a signal corresponding to the reproducing signal obtained from the reading element unit 38.

Figure 32:
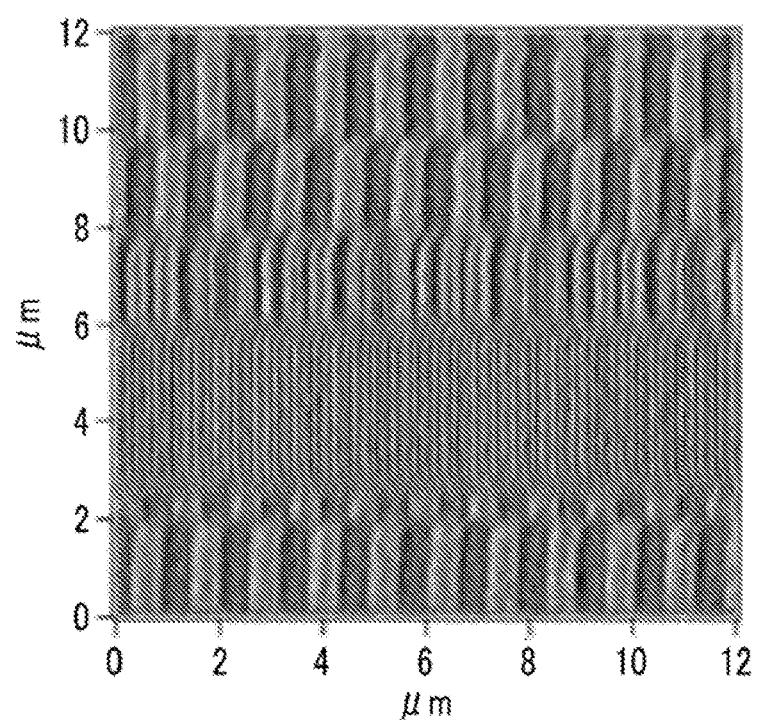
FIG. 32 is a view showing an example of a two-dimensional image of a reproducing signal obtained from a single reading element.

FIG. 32 shows an example of a two-dimensional image of the reproducing signal of the magnetic tape MT in a loop shape (hereinafter, also referred to as a "loop tape") obtained by using a loop tester. Here, the loop tester indicates a device which transports the loop tape in a state where the loop tape is repeatedly in contact with the single reading element, for example. In order to obtain a two-dimensional image in the same manner as in the case of the loop tester, a reel tester may be used or an actual tape drive may be used. The "reel tester" here indicates a device which transports the magnetic tape MT in a reel state, for example.

As described above, even in a case where a head for a magnetic tape of the related art which does not include the reading element unit on which the plurality of reading elements are loaded at adjacent positions is used, the effect according to the technology of the present disclosure can be quantitatively evaluated. As an example of an index for quantitatively evaluating the effect according to the technology of the present disclosure, a signal-to-noise ratio (SNR), an error rate, and the like are used.

Figure 4:
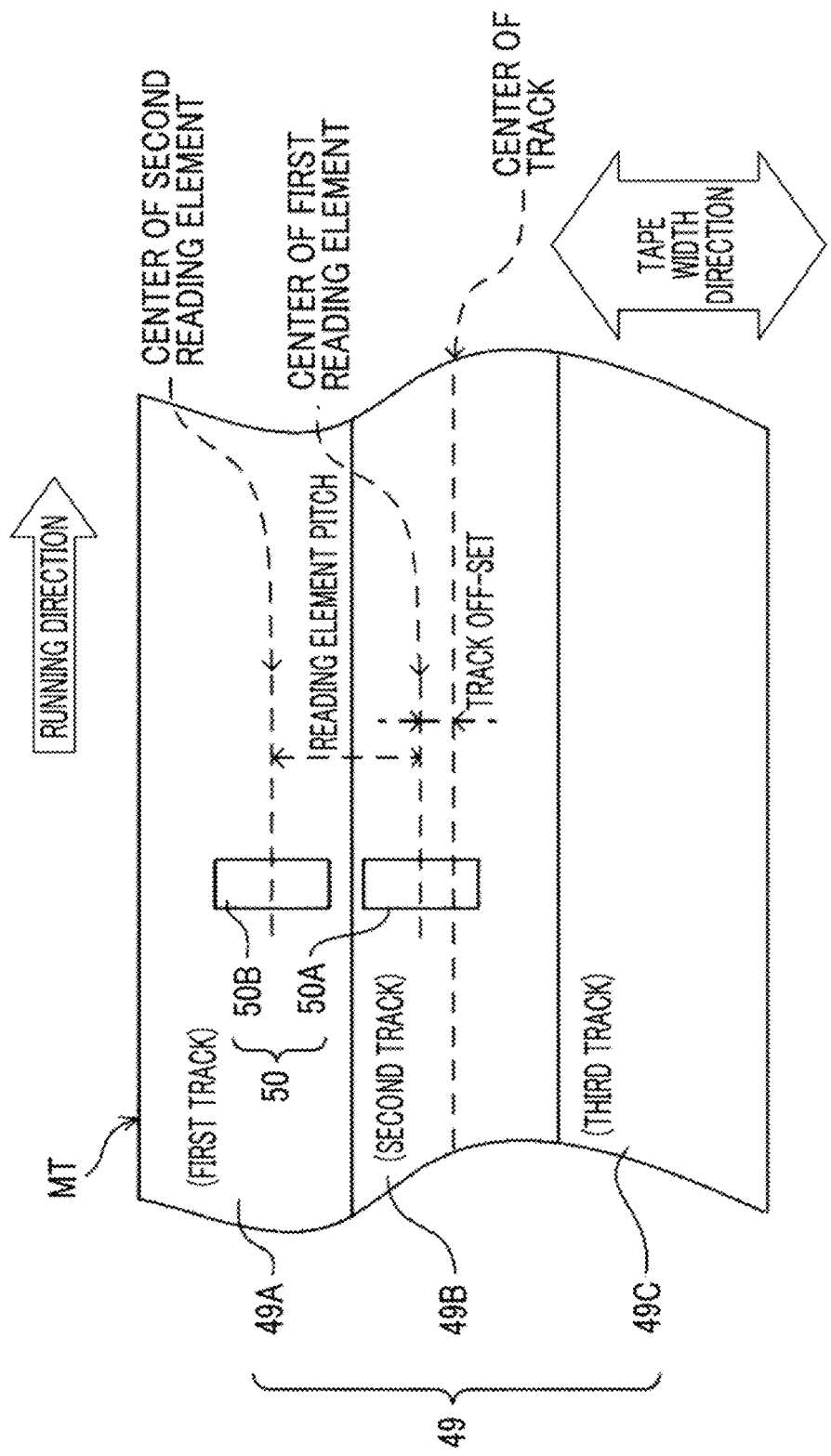
FIG. 4 is a schematic plan view showing an example of a schematic configuration in a plan view of a track region and a reading element pair.
Figure 5:
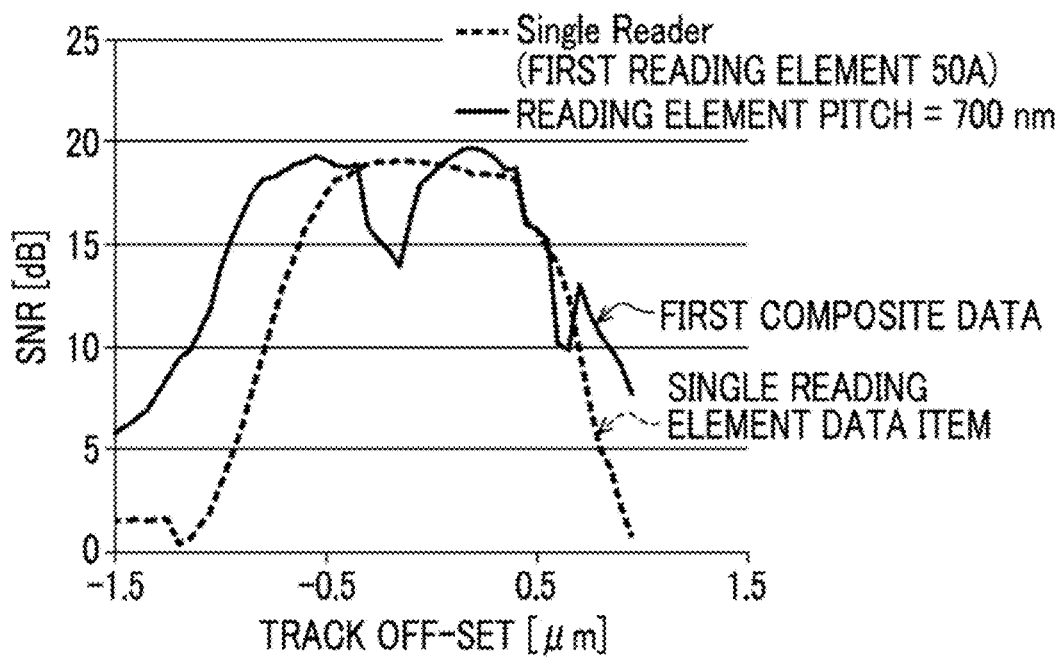
FIG. 5 is a graph showing an example of a correlation between an SNR regarding each of a single reading element data item and first composite data under a first condition, and track off-set.
Figure 6:
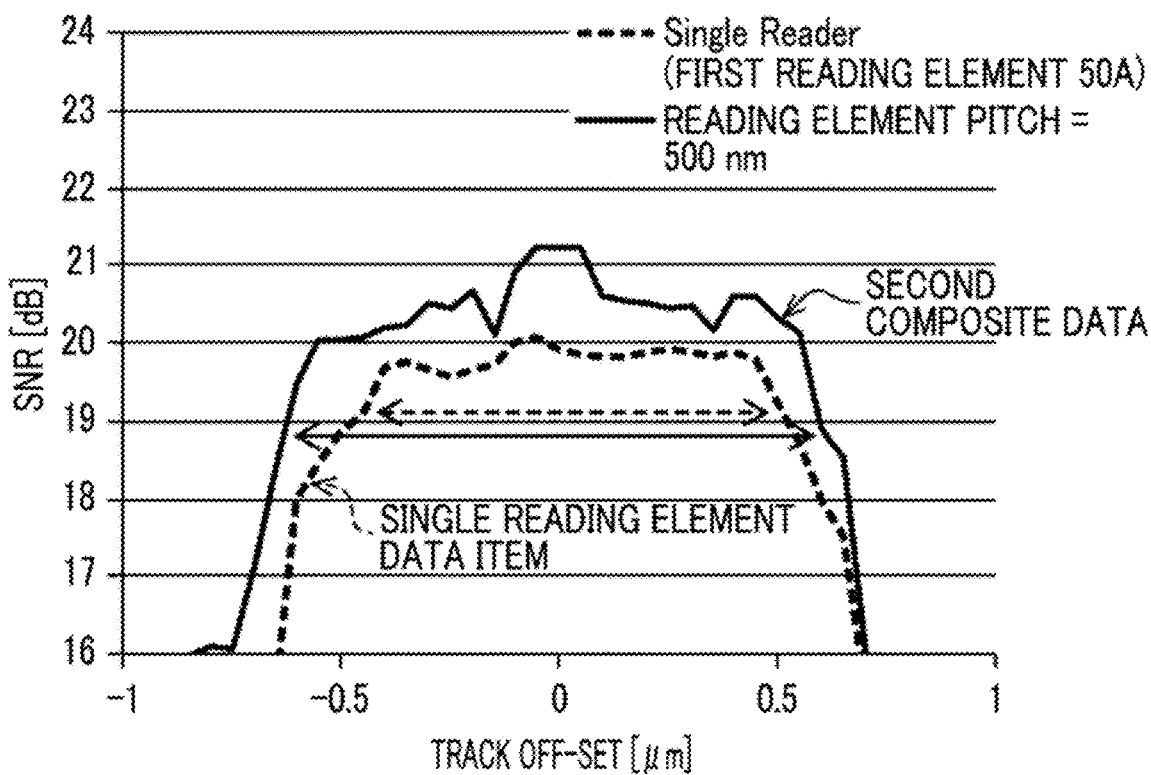
FIG. 6 is a graph showing an example of a correlation between an SNR regarding each of the single reading element data item and second composite data under a second condition, and track off-set.

FIGS. 4 to 6 show results obtained from experiments performed by the present inventors. As shown in FIG. 4 as an example, a reading element pair 50 is disposed on a track region 49. The track region 49 is a first track 49A, a second track 49B, and a third track 49C adjacent to each other in the tape width direction. The reading element pair 50 is a first reading element 50A and a second reading element 50B. The first reading element 50A and the second reading element 50B are disposed at positions adjacent to each other in the tape width direction. The first reading element 50A is disposed so as to face the second track 49B which is the reading target track and fall within the second track 49B. In addition, the second reading element 50B is disposed so as to face the first track 49A adjacent to one side of the second track 49B and fall within the first track 49A.

FIG. 5 shows an example of a correlation between a signal-to-noise ratio (SNR) regarding each of a single reading element data item and first composite data under a first condition, and track off-set. In addition, FIG. 6 shows an example of a correlation between an SNR regarding each of the single reading element data item and second composite data under a second condition, and track off-set.

Here, the single reading element data item indicates data obtained by performing a waveform equalization process with respect to data read by the first reading element 50A, in the same manner as in the case of the first reading element 40 shown in FIG. 3. The first condition indicates a condition in which a reading element pitch is 700 nm (nanometers). The second condition indicates a condition in which a reading element pitch is 500 nm. The reading element pitch indicates a pitch of the first reading element 50A and the second reading element 50B in the tape width direction, as shown in FIG. 4 as an example. The track off-set indicates a deviation amount between the center of the second track 49B in the tape width direction and the center of the first reading element 50A in the track width direction, as shown in FIG. 4 as an example.

The first composite data indicates data composed by adding first waveform equalized data and second waveform equalized data obtained under the first condition. The first waveform equalized data indicates data obtained by performing the waveform equalization process with respect to the data read by the first reading element 50A, in the same manner as in the case of the first reading element 40 shown in FIG. 3. The second waveform equalized data indicates data obtained by performing the waveform equalization process with respect to the data read by the second reading element 50B, in the same manner as in the case of the second reading element 42 shown in FIG. 3. The second composite data indicates data composed by adding first waveform equalized data and second waveform equalized data obtained under the second condition.

In a case of comparing the SNR of the first composite data shown in FIG. 5 to the SNR of the second composite data shown in FIG. 6, the SNR of the first composite data rapidly declines to generate a groove of the graph, in a case where the track off-set is −0.4 µm (micrometers) to 0.2 µm, whereas the SNR of the second composite data does not rapidly decline as in the graph of the SNR of the first composite data. Each of the SNR of the first composite data and the SNR of the second composite data is higher than the SNR of the single reading element data, and particularly, the SNR of the second composite data is higher than the SNR of the single reading element data item over the entire range of the track off-set.

From the experimental results shown in FIGS. 5 and 6, the present inventors have found that it is preferable to perform the reading of data in a state where the first reading element 50A and the second reading element 50B are adjacent to each other in the tape width direction, compared to a case where the reading of data is performed by only the first reading element 50A. The "state adjacent to each other" here means a state where the first reading element 50A and the second reading element 50B are not in contact with each other, but are disposed in a line in the tape width direction, so that the SNR becomes higher than the SNR of the single reading element data, over the entire range of the track off-set.

In the embodiment of the present disclosure, as shown in FIG. 3 as an example, in the reading element unit 38, parts of the first reading element 40 and the second reading element 42 overlap each other in the running direction, and accordingly, a high density of the tracks included in the magnetic tape MT is realized.

For various steps for manufacturing the magnetic tape, reference can be made to paragraphs 0067 to 0070 of JP2010-231843A. The servo pattern can be formed in the magnetic tape by a known method in order to enable control of the tracking of the magnetic head (the reading head) in the magnetic tape reading apparatus and control of the running speed of the magnetic tape. The servo pattern is normally formed along the longitudinal direction of the magnetic tape.

Examples of the control method by using the servo pattern (the servo control) include timing based servo (TBS), amplitude servo, and frequency servo. Hereinafter, the formation of the servo pattern will be further described.

As shown in European computer manufacturers association (ECMA)-319, the magnetic tape compliant with the linear tape-open (LTO) standard (generally called the "LTO tape") employs a timing based servo method. In the timing based servo method, the servo pattern is configured by a plurality of a pair of non-parallel magnetic stripes (referred to herein as a "first diagonal line" and a "second diagonal line") that are continuously in the longitudinal direction of the magnetic tape. The reason why the servo pattern is configured by a pair of non-parallel magnetic stripes is to teach the passage position to the servo reading element that passes over the servo pattern. Specifically, the pair of magnetic stripes is formed such that the interval thereof continuously changes along the width direction of the magnetic tape, and the servo reading element reads the interval to recognize a relative position between the servo pattern and the servo reading element. The information on the relative position enables tracking of the data track. Therefore, a plurality of servo tracks are normally set on the servo pattern along the width direction of the magnetic tape.

The servo band is configured by the servo patterns that are continuous in the longitudinal direction of the magnetic tape. A plurality of the servo bands are normally provided in the magnetic tape. For example, the number of the servo bands is five in the LTO tape. A region interposed between the two adjacent servo bands is called a data band. The data band is configured by the plurality of data tracks, and each of the data tracks corresponds to each servo track.

Also, in one aspect, as disclosed in JP2004-318983A, information indicating a servo band number (also referred to as "servo band identification (ID)" or "UDIM information") is embedded in each servo band. The servo band ID is recorded by shifting a specific magnetic stripe among the plurality of the pair of the magnetic stripes in the servo band so that the position thereof is relatively displaced in the longitudinal direction of the magnetic tape. Specifically, the way of shifting the specific magnetic stripe among the plurality of the pair of magnetic stripes is changed for each servo band. Accordingly, because the recorded servo band ID is unique for each servo band, the servo band can be uniquely specified only by reading one servo band with the servo reading element.

Examples of the method of uniquely specifying the servo band include a method by using a staggered method shown in ECMA-319. In the staggered method, the recording is performed by shifting a group of the plurality of the pair of non-parallel magnetic stripes which are continuously disposed in the longitudinal direction of the magnetic tape, in the longitudinal direction of the magnetic tape for each servo band. A combination of the shifting method between the adjacent servo bands is unique throughout the magnetic tape, and thus it is possible to uniquely specify the servo band in a case where the two servo reading element read the servo pattern.

Also, information indicating a position of the magnetic tape in the longitudinal direction (also referred to as "LPOS information") as shown in ECMA-319 is normally embedded in each servo band. The LPOS information is also recorded by shifting the position of the pair of magnetic stripes in the longitudinal direction of the magnetic tape as in the case of the UDIM information. However, unlike the UDIM information, in the LPOS information, the same signal is recorded on each servo band.

It is possible to embed other information different from the UDIM information and the LPOS information in the servo band. In this case, the embedded information may be different for each servo band as in the UDIM information or may be common to all servo bands as in the LPOS information.

Also, as the method of embedding information in the servo band, methods other than the above can be adopted. For example, a predetermined code may be recorded by thinning out a predetermined pair from a group of the pair of magnetic stripes.

A head for forming a servo pattern is called a servo recording head. The servo recording head has a pair of gap patterns corresponding to the pair of magnetic stripes as many as the number of servo bands. Normally, a core and a coil are connected to each pair of gap patterns, and a magnetic field generated in the core can generate a leakage magnetic field in the pair of gap patterns by supplying a current pulse to the coil. In a case where the servo pattern is formed, the current pulse is input while running the magnetic tape on the servo recording head and the magnetic pattern corresponding to the pair of gap patterns is transferred to the magnetic tape to form the servo pattern. A width of each gap pattern can be appropriately set in accordance with a density of the servo pattern to be formed. For example, the width of each gap pattern can be set to 1 µm or less, 1 to 10 µm, or 10 µm or more.

Before the servo pattern is formed on the magnetic tape, the magnetic tape is normally subjected to an erase process. This erase process can be performed by applying a uniform magnetic field to the magnetic tape using a direct current magnet or an alternating current magnet. Examples of the erase process includes the direct current (DC) erase and the alternating current (AC) erase. The AC erase is performed by reversing the direction of the magnetic field applied to the magnetic tape and gradually decreasing the strength of the magnetic field. Meanwhile, the DC erase is performed by applying the magnetic field to the magnetic tape in one direction. For the DC erase, there are two additional methods. The first method is the horizontal DC erase that applies the magnetic field in one direction along the longitudinal direction of the magnetic tape. The second method is the vertical DC erase that applies the magnetic field in one direction along the thickness direction of the magnetic tape. The erase process may be performed with respect to the entire magnetic tape or may be performed for each servo band of the magnetic tape.

The direction of the magnetic field of the servo pattern to be formed is determined in accordance with the direction of erase. For example, in a case where the magnetic tape is subjected to the horizontal DC erase, the servo pattern is formed such that the direction of the magnetic field is opposite to the direction of erase. Accordingly, the output in a case where the servo pattern is read can be increased. As disclosed in JP2012-053940A, in a case where transferring of the pattern using the gap pattern is performed on the magnetic tape subjected to the vertical DC erase, the read signal of the formed servo pattern has a pole pulse shape. Meanwhile, in a case where transferring of the pattern using the gap pattern is performed on the magnetic tape subjected to the horizontal DC erase, the read signal of the formed servo pattern has a bipolar pulse shape.

The magnetic head that records data and/or reads data may include the servo reading element. Alternatively, as a head different from the magnetic head that records data and/or read data, a magnetic head comprising the servo reading element (a servo head) may be included in the magnetic tape reading apparatus. For example, the magnetic head that records data and/or read data includes two servo reading elements, and each of two servo reading elements can simultaneously reads two adjacent servo bands. One or a plurality of reading elements for data can be disposed between two servo reading elements.

Figure 7:
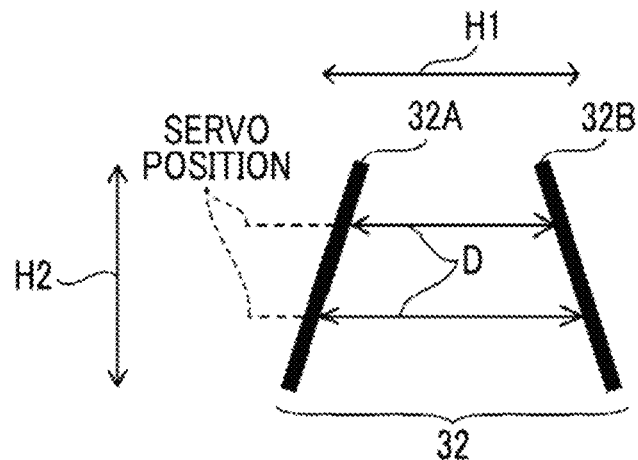
FIG. 7 is an example of a servo pattern.

As shown in FIG. 7, each of the first diagonal line 32A and the second diagonal line 32B of the servo pattern 32 according to the present embodiment is a signal that is linear and has different slopes. Specifically, the first diagonal line 32A and the second diagonal line 32B are signals in which a distance D therebetween in the direction H1 corresponding to the tape longitudinal direction becomes gradually longer toward one side of the direction H2 from the other side of the direction H2 corresponding to the tape width direction. Stated another way, the first diagonal line 32A and the second diagonal line 32B according to the present embodiment are signals having the different distances D for each position (hereinafter, referred to as the "servo position") of the servo band SB in the direction H2 (see JP2004-318983A). The "tape longitudinal direction" here indicates a longitudinal direction of the magnetic tape MT.

Figure 8:
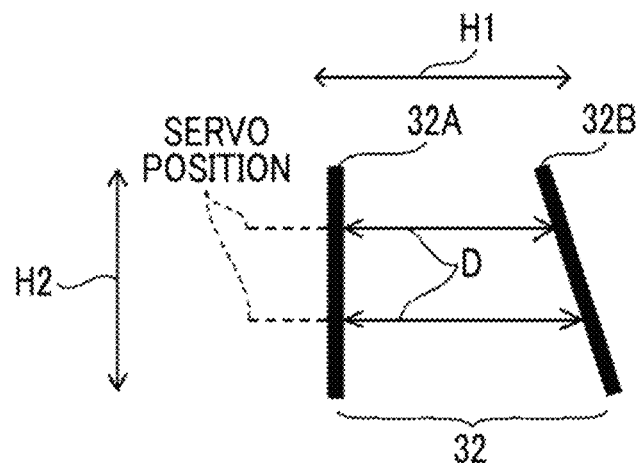
FIG. 8 is an example of a servo pattern.
Figure 9:
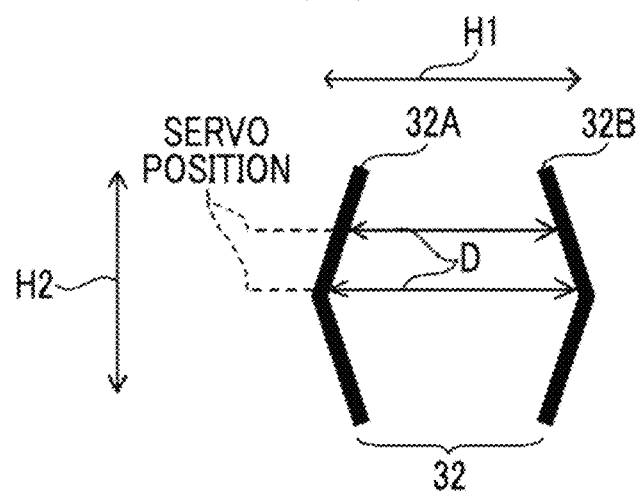
FIG. 9 is an example of a servo pattern.

The first diagonal line 32A and the second diagonal line 32B are not limited to the example shown in FIG. 7 as long as the signals are linear and have different slopes. For example, as shown in FIG. 8, the first diagonal line 32A may be a linear signal in the same direction as the direction H2 and the second diagonal line 32B may be a linear signal inclined a predetermined angle with respect to the direction H2. As shown in FIG. 9, the first diagonal line 32A and the second diagonal line 32B may be signals in which the distance D therebetween becomes gradually longer and then becomes gradually shorter along the direction H2. For example, the first diagonal line 32A and the second diagonal line 32B may have shapes as shown in FIGS. 3 to 6 of JP4383620B.

The servo pattern 32 is used for positioning the reading head that reads data with respect to the data band DB of the magnetic tape MT, in the direction H2. The method of positioning the reading head by using the servo pattern 32 is called a timing based servo method.

In the timing based servo method, the reading head is positioned by using the distance D associated with each servo position of the first diagonal line 32A and the second diagonal line 32B prepared in advance in a form of table. For this reason, the lower the degree of linearity between the first diagonal line 32A and second diagonal line 32B recorded on the magnetic tape MT, the greater the error between the distance D between the first diagonal line 32A and the second diagonal line 32B at a certain servo position and the distance D prepared in advance. Accordingly, in this case, the positioning accuracy of the reading head is lowered.

Figure 10:
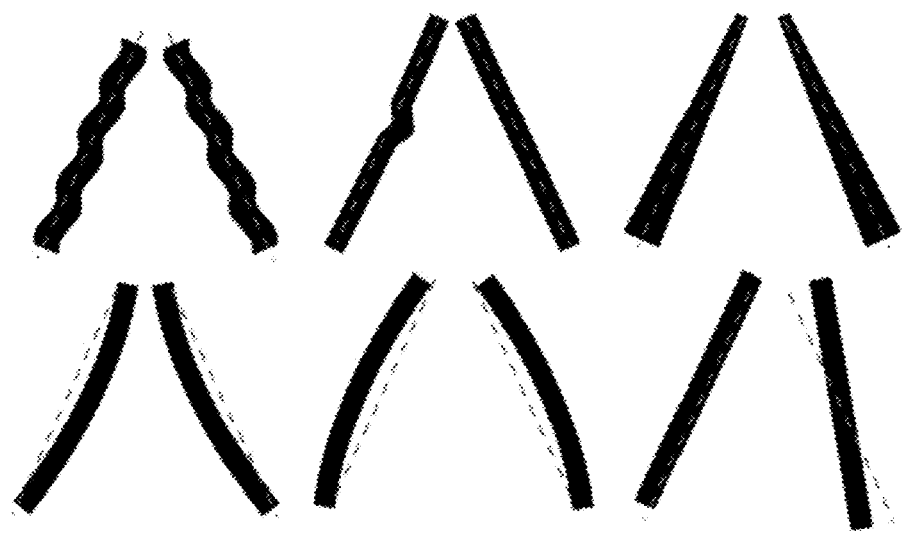
FIG. 10 is an example of an actually recorded servo pattern.

As shown in FIG. 10 as an example, the first diagonal line 32A and the second diagonal line 32B of the servo pattern 32 may not be recorded linearly due to various causes. With regard to this reason, it has been found that the degree of linearity of the gap pattern of the servo recording head is dominant by the inventor's earnest study. In the present embodiment, information on the linearity of the gap pattern of the servo recording head is used as the information on the linearity of the servo pattern 32.

Hereinafter, the information on the linearity of the servo pattern 32 and the control of positioning the reading head 16 (the reading element unit 38) by using the information on the linearity of the servo pattern 32 will be described.

Figure 11:
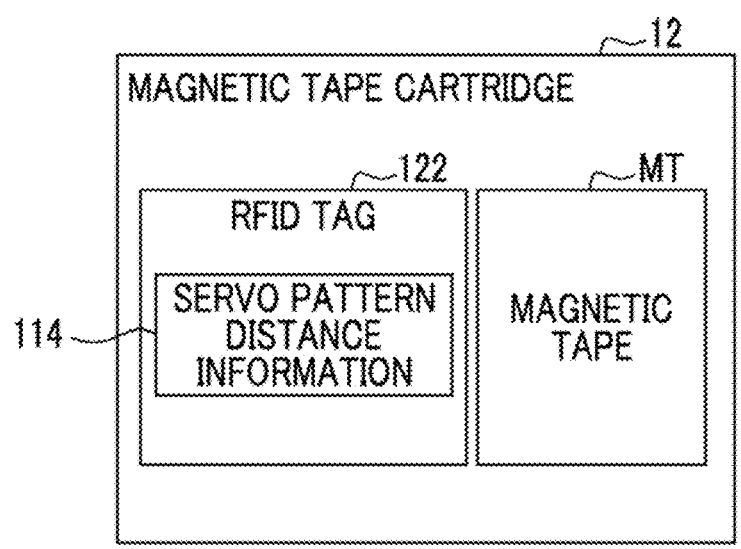
FIG. 11 is a block diagram showing an example of a configuration of a magnetic tape cartridge according to the embodiment.

A configuration of the magnetic tape cartridge 12 according to the present embodiment will be described. As shown in FIG. 11, the magnetic tape cartridge 12 comprises a radio frequency identifier (RFID) tag 122 as an example of the recording medium being capable of reading the recorded information in a non-contact manner by wireless communication, in addition to the above described magnetic tape MT. Servo pattern distance information 114 is recorded on the RFID tag 122. The servo pattern distance information 114 is an example of information on linearity of the servo pattern. Details of the servo pattern distance information 114 will be described below.

Hereinafter, a process for positioning the reading head 16, that is, the reading element unit 38 with respect to the tape width direction in which the servo pattern 32 is formed will be described with reference to FIGS. 12 and 13. In the following, in a case where it is simply described as the position of the reading head 16, the position of the servo reading element pair 36, and the position of the reading element unit 38, it means the position along the tape width direction.

Figure 12:
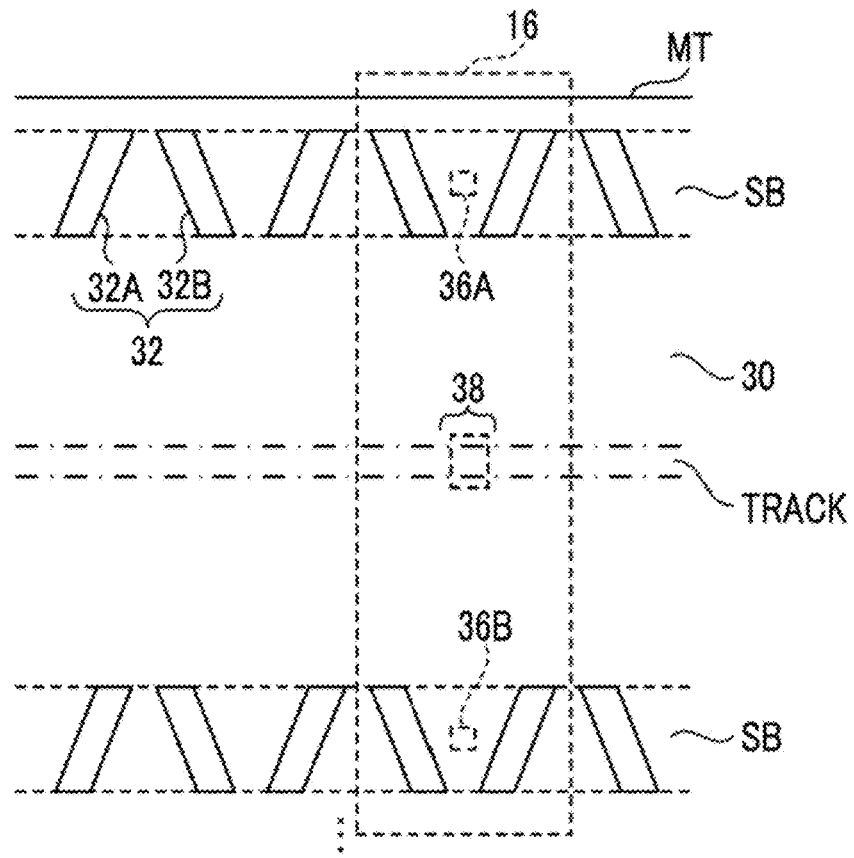
FIG. 12 is a plan view for explaining a positioning process of a reading head according to the embodiment.

As shown in FIG. 12, in the present embodiment, in a case where the magnetic tape MT runs in a predetermined running direction, the reading head 16 is positioned with respect to the magnetic tape MT by positioning the servo reading element pair 36 of the reading head 16 to a predetermined position of the servo band SB in the width direction.

In a case where the first diagonal line 32A and the second diagonal line 32B pass through a detection position of the servo reading element pair 36, the servo reading element pair 36 detects the first diagonal line 32A and the second diagonal line 32B. The reading head 16 is positioned at a position where the detection interval between the first diagonal line 32A and the second diagonal line 32B is a predetermined value. Accordingly, the reading element unit 38 of the reading head 16 follows a predetermined track.

Figure 13:
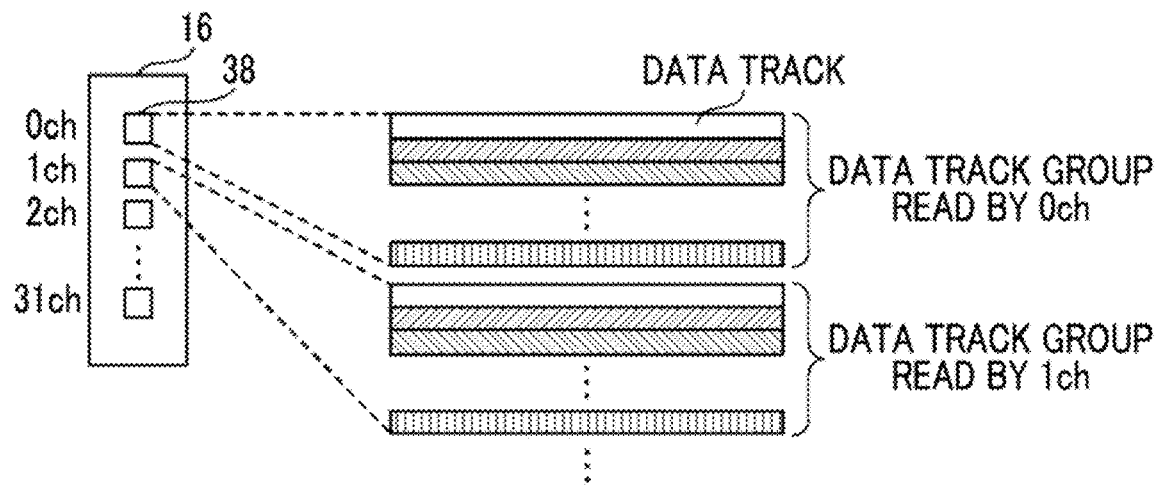
FIG. 13 is a view for explaining a reading process of data by a reading element unit according to the embodiment.

As shown in FIG. 13, a plurality of the reading element units 38 are provided (32 units in the example of FIG. 13) and can simultaneously read data from the plurality of tracks. Hereinafter, the position of the reading head 16 in a case of reading data from a predetermined track is referred to as a "wrap position".

Figure 14:
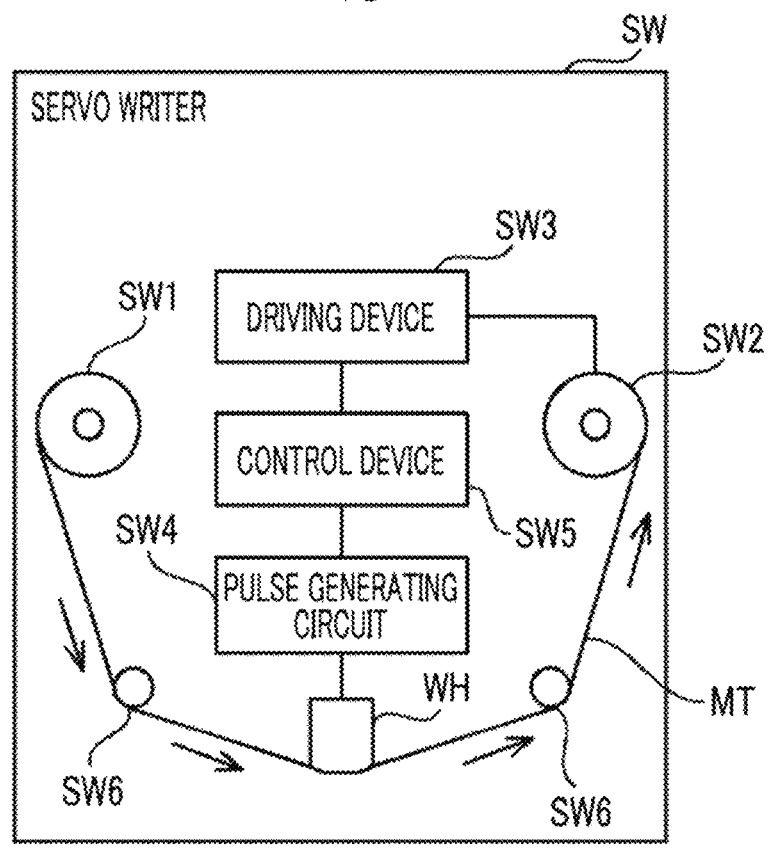
FIG. 14 is a view showing an example of a configuration of a servo writer according to the embodiment.
Figure 15:
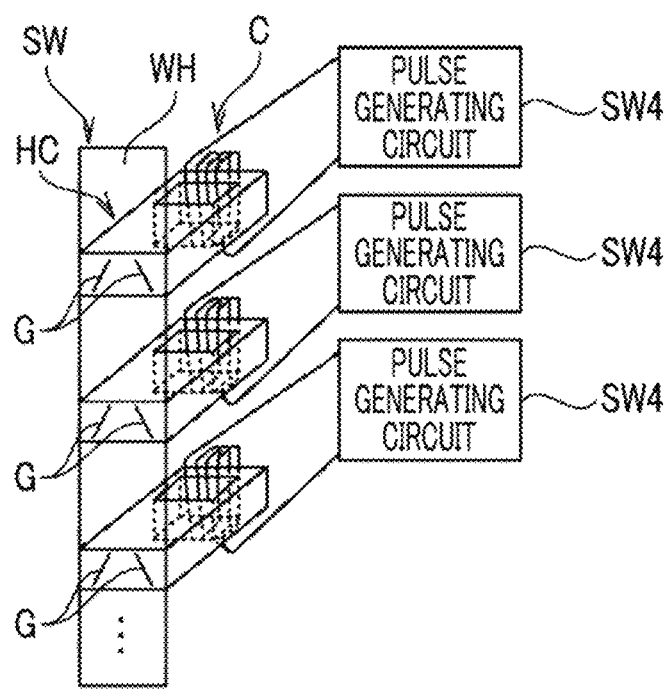
FIG. 15 is a view showing an example of a configuration of a servo writer according to the embodiment.

Next, the configuration of the servo writer SW that records the servo pattern 32 on each servo band SB of the magnetic tape MT according to the present embodiment with reference to FIGS. 14 and 15.

As shown in FIG. 14, the servo writer SW comprises the sending reel SW1, the winding reel SW2, the driving device SW3, the pulse generating circuit SW4, the control device SW5, and the servo recording head WH. Also, the servo writer SW comprises a power supply device, a cleaning device that cleans the magnetic tape MT, and verification device that inspects the servo pattern 32 recorded on the magnetic tape MT, which are not shown.

The sending reel SW1 in which the magnetic tape MT cut into a product width from a wide web before writing the servo pattern 32 is set by a large diameter roll pancake sends out the magnetic tape MT in a case of writing the servo pattern 32. The magnetic tape MT sent out by the sending reel SW1 is guided by the guide SW6 and transported to the servo recording head WH. The magnetic tape MT in which the servo pattern 32 is recorded on each servo band SB by the servo recording head WH is guided by the guide SW6 and transported to the winding reel SW2. The winding reel SW2 is rotatably driven by the driving device SW3 and the magnetic tape MT on which the servo pattern 32 is recorded is wound therearound.

The driving device SW3 is a device that rotatably driving the winding reel SW2 and comprises a motor (not shown), a motor driving circuit that supplies a current to the motor, a gear that connects the motor shaft and the winding reel SW2, and the like. The driving device SW3 generates a motor current by the motor driving circuit based on a motor current signal from the control device SW5, supplies the motor current to the motor, transmits the rotational driving force of the motor to the winding reel SW2 via the gear, and rotatably drives the winding reel SW2.

The pulse generating circuit SW4 is a circuit that supplies a recording pulse current to a plurality of coils C (see FIG. 15) provided in the servo recording head WH based on the pulse control signal of the control device SW5 and is independently provided in each of the plurality of coils C. Specifically, the pulse generating circuit SW4 alternately generates a pulse current and a zero current that have a positive polarity or a negative polarity based on the pulse control signal from the control device SW5 and records the servo pattern 32 on a predetermined position of each servo band SB. The recording pulse current has a sufficient current value to magnetize the magnetic layer of the magnetic tape MT by the leakage magnetic flux from the gap pattern G (see FIG. 15) and is set in consideration of the characteristics of the coil C of the servo recording head WH.

As shown in FIG. 15, the servo recording head WH includes the linear gap pattern G provided at a position corresponding to each servo band SB and records the servo pattern 32 on the servo band SB of the magnetic tape MT by each gap pattern G. One linear pattern of the gap pattern G is inclined corresponding to the angle of the first diagonal line 32A and the other linear pattern is non-parallel to one linear pattern corresponding to the second diagonal line 32B. The gap pattern G is an example of the servo recording element that records the servo pattern 32 on the servo band SB.

The head core HC is independent for each gap pattern G, and the coil C is wound around each head core HC. Each pulse generating circuit SW4 connected to each coil C converts data for distinguishing the servo bands SB encoded by the control device SW5 to a pattern of the recording pulse current and supplies the recording pulse current to the coil C according to the pattern. Accordingly, unique identification information in accordance with each servo band SB is embedded in the servo pattern 32 of each servo band SB. The head core HC may be independent for each gap pattern G, for example, one head core HC may be provided corresponding to all the gap pattern G. In this case, the servo pattern 32 is recorded on each servo band SB at a time by one recording pulse current.

Figure 16:
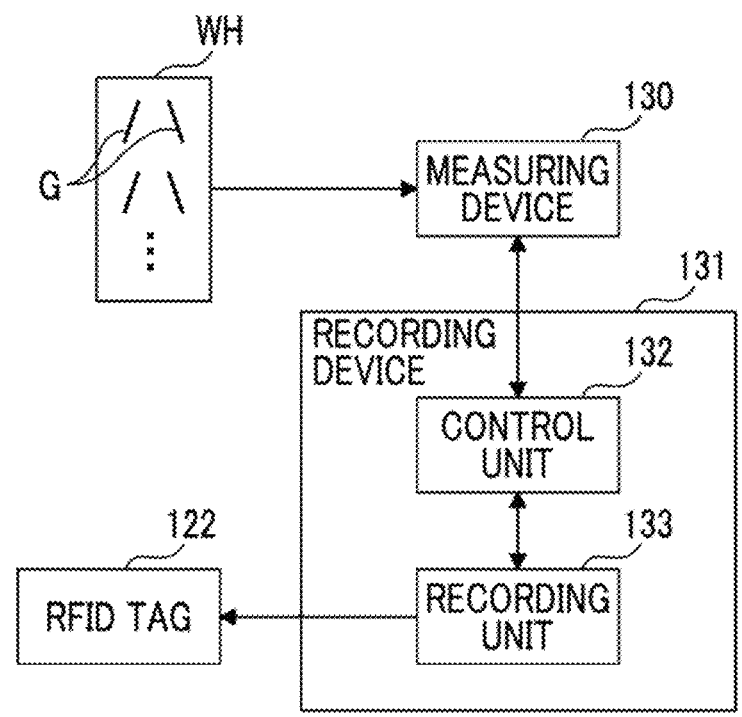
FIG. 16 is a block diagram showing an example of a configuration of a measuring device and a recording device according to the embodiment.

Next, the configuration of the measuring device 130 and the recording device 131 for recording the servo pattern distance information 114 of the gap pattern G on the RFID tag 122 of the magnetic tape cartridge 12 will be described with reference to FIG. 16. Examples of the measuring device 130 include a magnetic force microscope (MFM), a scanning electron microscope (SEM), and a laser microscope. The recording device 131 includes the control unit 132 including a central processing unit (CPU) and a memory as a temporary storage area, and the recording unit 133 that records the information on the RFID tag 122 in a non-contact manner.

The measuring device 130 measures the servo recording head WH of the servo writer SW and outputs the signals in accordance with the distance of the direction corresponding to the tape longitudinal directions of two gap patterns G.

Figure 17:
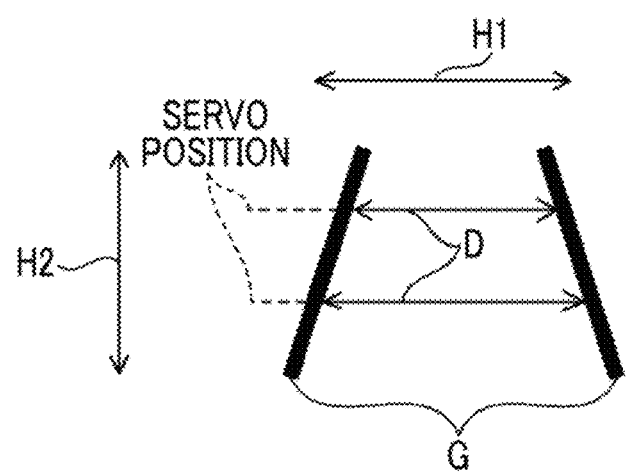
FIG. 17 is a view for explaining a distance between two gap patterns according to the embodiment.

The control unit 132 of the recording device 131 acquires the signals output from the measuring device 130. As shown in FIG. 17 as an example, the control unit 132 derives a distance D in a direction H1 corresponding to the tape longitudinal direction of two gap patterns G by using the acquired signals. The control unit 132 derives the distance D for each position corresponding to the servo pattern 32 (hereinafter, referred to as the "servo position") along the direction H2 corresponding to the tape width direction. The servo position corresponds to the wrap position. The control unit 132 controls the recording unit 133 to record the derived distance D, as the servo pattern distance information 114, on the RFID tag 122 in association with the number of the servo band SB corresponding to each gap pattern G and the servo position.

Figure 18:
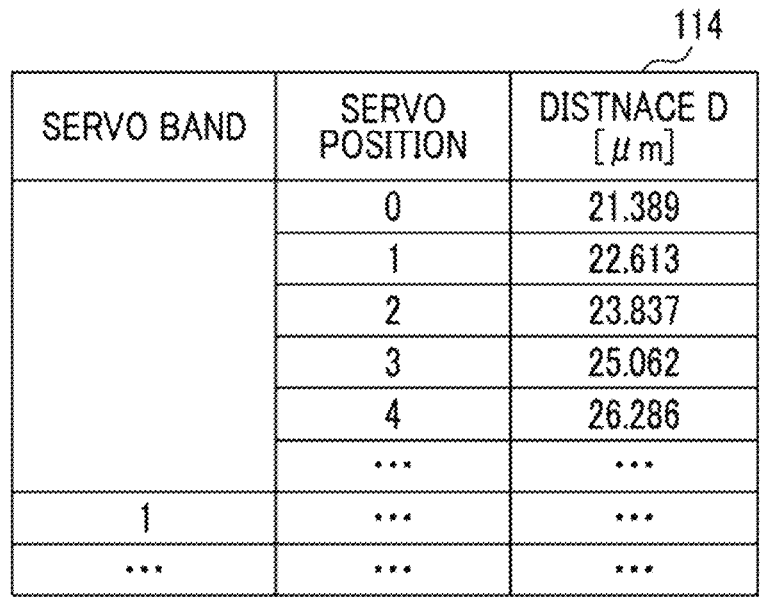
FIG. 18 is a view showing an example of servo pattern distance information according to the embodiment.

FIG. 18 shows a view showing an example of recording the servo pattern distance information 114 in a form of table. As shown in FIG. 18, the servo pattern distance information 114 includes the distance D corresponding to the combination of the number of the servo band SB and the servo position. In an example shown in FIG. 18, the distance D at each servo position in a case where the servo pattern 32 is assumed in which the azimuth angle is 12°, a length in the tape width direction is 93 μm, the distance between the first diagonal line 32A and the second diagonal line 32B in the tape longitudinal direction at a center position (a position of 46.5 μm (=93/2)) in the tape width direction is 38 μm.

Based on the distance D, according to Equation (1) below, it is calculated which servo position the distance D corresponds to. The "distance at a center point" in Equation (1) indicates a distance between the first diagonal line 32A and the second diagonal line 32B in the tape longitudinal direction at the center position in the tape width direction of the servo pattern 32 (in the example shown in FIG. 18, 38 μm). Stated another way, in Equation (1), the servo position is calculated by the distance in the width direction with reference to the center position in the width direction of the servo pattern 32.

$$\text{Servo position} = \frac{\text{Distance at center point} - \text{Distance } D}{2 \times \tan^{Azimuth\ angle}} \quad (1)$$

Next, an example of a flow of a recording process for recording the servo pattern 32 on the magnetic tape MT of the magnetic tape cartridge 12 and recording the servo pattern distance information 114 on the RFID tag 122 will be described with reference to FIG. 19.

Figure 19:
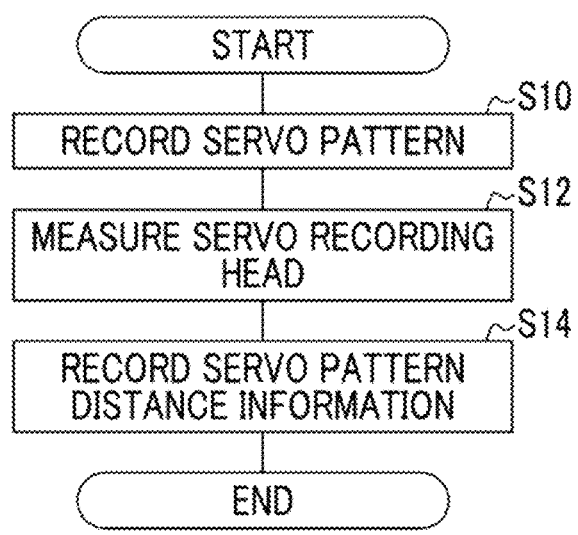
FIG. 19 is a flowchart showing an example of a recording process according to the embodiment.

In step S10 in FIG. 19, the servo writer SW records the servo pattern 32 on each servo band SB of the magnetic tape MT by the gap pattern G corresponding to the servo recording head WH by the control of the control device SW5, as described above.

In step S12, the measuring device 130 measures the servo recording head WH of the servo writer SW used for the processing of step S10 and outputs the signals of the measurement result, as described above. In step S14, the control unit 132 of the recording device 131 derives the distance D by using the signal output by the processing of step S12, as described above. The control unit 132 controls the recording unit 133 to record the derived distance D, as the servo pattern distance information 114, on the RFID tag 122 in association with the number of the servo band SB corresponding to each gap pattern G and the servo position. After the processing of step S14 ends, the recording process ends.

Note that the processing order of the recording process is not limited to the example shown in FIG. 19. For example, after the processing of step S12 and step S14 is executed, the processing of step S10 may be executed. Through the above process, the servo pattern 32 is recorded on the servo band SB and the magnetic tape cartridge 12 on which the servo pattern distance information 114 is recorded on the RFID tag 122 is shipped.

Next, a configuration of a record reading system 160 that records and reads data with respect to the magnetic tape cartridge 12 will be described with reference to FIG. 20.

Figure 20:
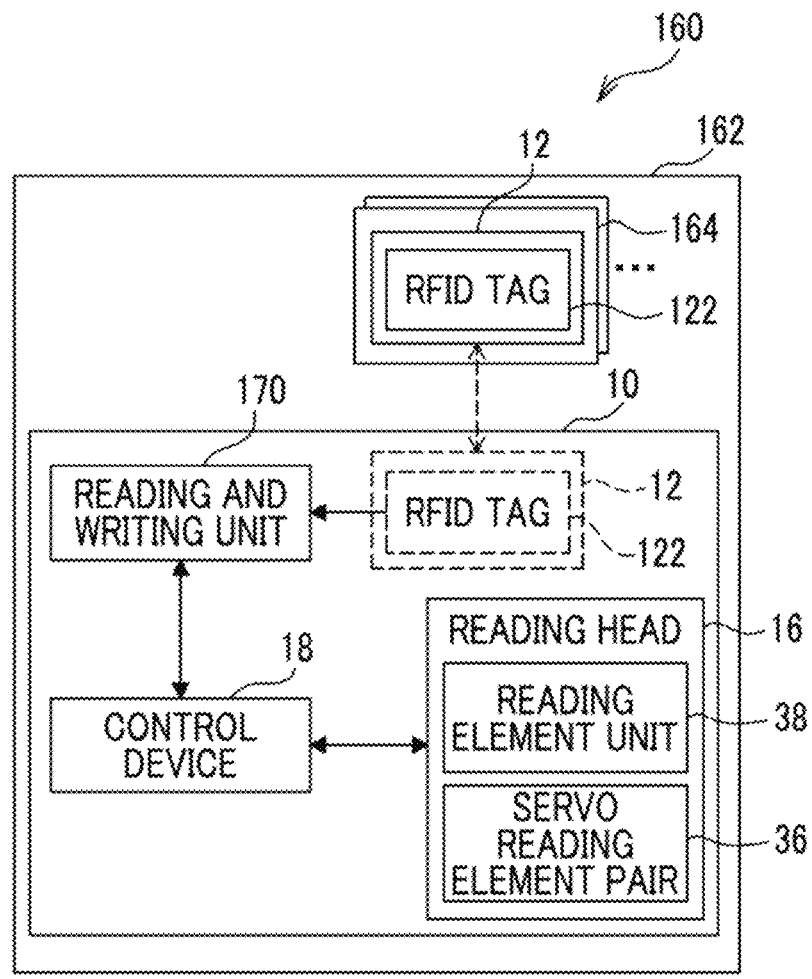
FIG. 20 is a block diagram showing an example of a configuration of a record reading system according to the embodiment.

As shown in FIG. 20, the record reading system 160 includes a tape library 162. The tape library 162 comprises a plurality of slots 164 and the magnetic tape reading apparatus 10.

The magnetic tape cartridge 12 is accommodated in the slot 164. The magnetic tape cartridge 12 extracted from the slot 164 is loaded in the magnetic tape reading apparatus 10. After data is read with respect to the magnetic tape MT of the magnetic tape cartridge 12 loaded in the magnetic tape reading apparatus 10, magnetic tape cartridge 12 is unloaded from the magnetic tape reading apparatus 10 and accommodated in the slot 164.

The magnetic tape reading apparatus 10 comprises a reading and writing unit 170 in addition to the control device 18 and the reading head 16 described above. The reading and writing unit 170 reads the information recorded on the RFID tag 122 stored in the magnetic tape cartridge 12 in a non-contact manner by the control of the control device 18 and outputs the read information to the control device 18. The reading and writing unit 170 records the information on the RFID tag 122 in a non-contact manner by the control of the control device 18. An example of the reading and writing unit 170 is a RFID reader/writer.

Figure 21:
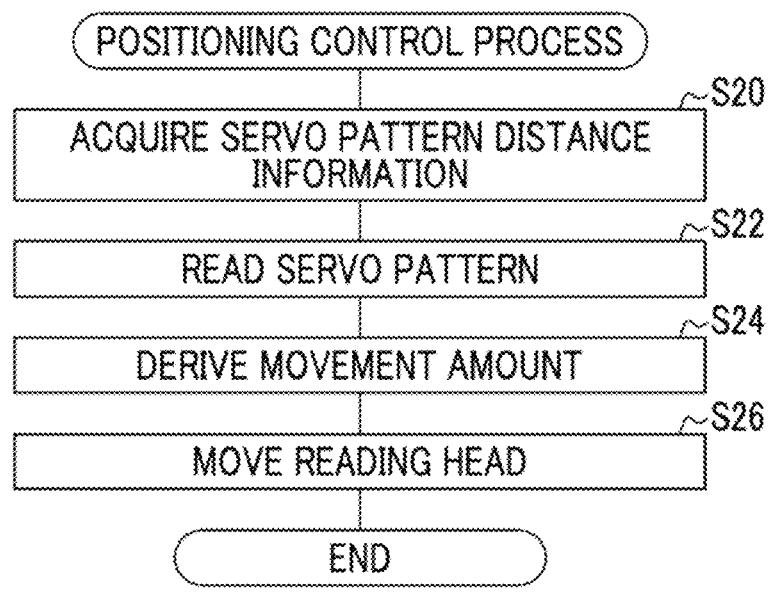
FIG. 21 is a flowchart showing an example of a positioning control process according to the embodiment.

Next, the operation of the magnetic tape reading apparatus 10 according to the present embodiment will be described with reference to FIG. 21. The positioning control process shown in FIG. 21 is executed in a case where the execution instruction for reading data from the magnetic tape MT of the magnetic tape cartridge 12 is input to the control device 18 by the user. The control device 18 is an example of "the processor", "the control unit that performs control of positioning the reading element unit" and "the acquisition unit" according to the present disclosure. Here, it is assumed that the positioning control process is executed in a state where the magnetic tape cartridge 12 is loaded in the magnetic tape reading apparatus 10.

In step S20 in FIG. 21, the control device 18 controls the reading and writing unit 170 to read the servo pattern distance information 114 recorded on the RFID tag 122 of the magnetic tape cartridge 12. The control device 18 acquires the servo pattern distance information 114 read from the reading and writing unit 170.

In following step S22, the control device 18 controls the reading head 16 to read the servo pattern 32 recorded on the servo band SB of the magnetic tape MT by the servo reading element pair 36.

In following step S24, the control device 18 derives the distance described below from the difference between the timing when the first diagonal line 32A of the servo pattern 32 read in step S22 is read and the timing when the second diagonal line 32B is read. Stated another way, in this case, the control device 18 derives the distance between the first diagonal line 32A and the second diagonal line 32B at the current position of the servo reading element pair 36 in the tape width direction. The control device 18 derives the servo position corresponding to the derived distance by performing the interpolation process using the closest distance on the shorter side than the derived distance and the closest distance on the longer side, in the servo pattern distance information 114 acquired in step S20.

The control device 18 derives the movement amount from the servo position corresponding to the derived distance to the servo position corresponding to a predetermined target position.

In following step S26, the control device 18 controls the reading head 16 to move along the tape width direction of the reading head 16 by the movement amount derived in step S24. Through the process for moving the reading head 16, the control device 18 controls positioning of the reading head 16 along the tape width direction. Data is read from the track of the track region 30 of the magnetic tape MT by the reading element unit 38 in accordance with the position determined in step S26. After data is read from the track, the magnetic tape cartridge 12 is unloaded from the magnetic tape reading apparatus 10 and the unloaded magnetic tape cartridge 12 is accommodated in the slot 164. After the processing of step S26 ends, the positioning control process ends.

As described above, according to the present embodiment, the information on the linearity of the gap pattern in the servo recording head, that is, the information on the linearity of the servo pattern is recorded on the recording medium included in the magnetic tape cartridge. Therefore, the information on the linearity of the servo pattern can be easily recorded.

Next, a method of reading data recorded on the magnetic tape MT will be described including the data extraction process in a state where the positioning control of the reading element unit 38 is performed.

Figure 22:
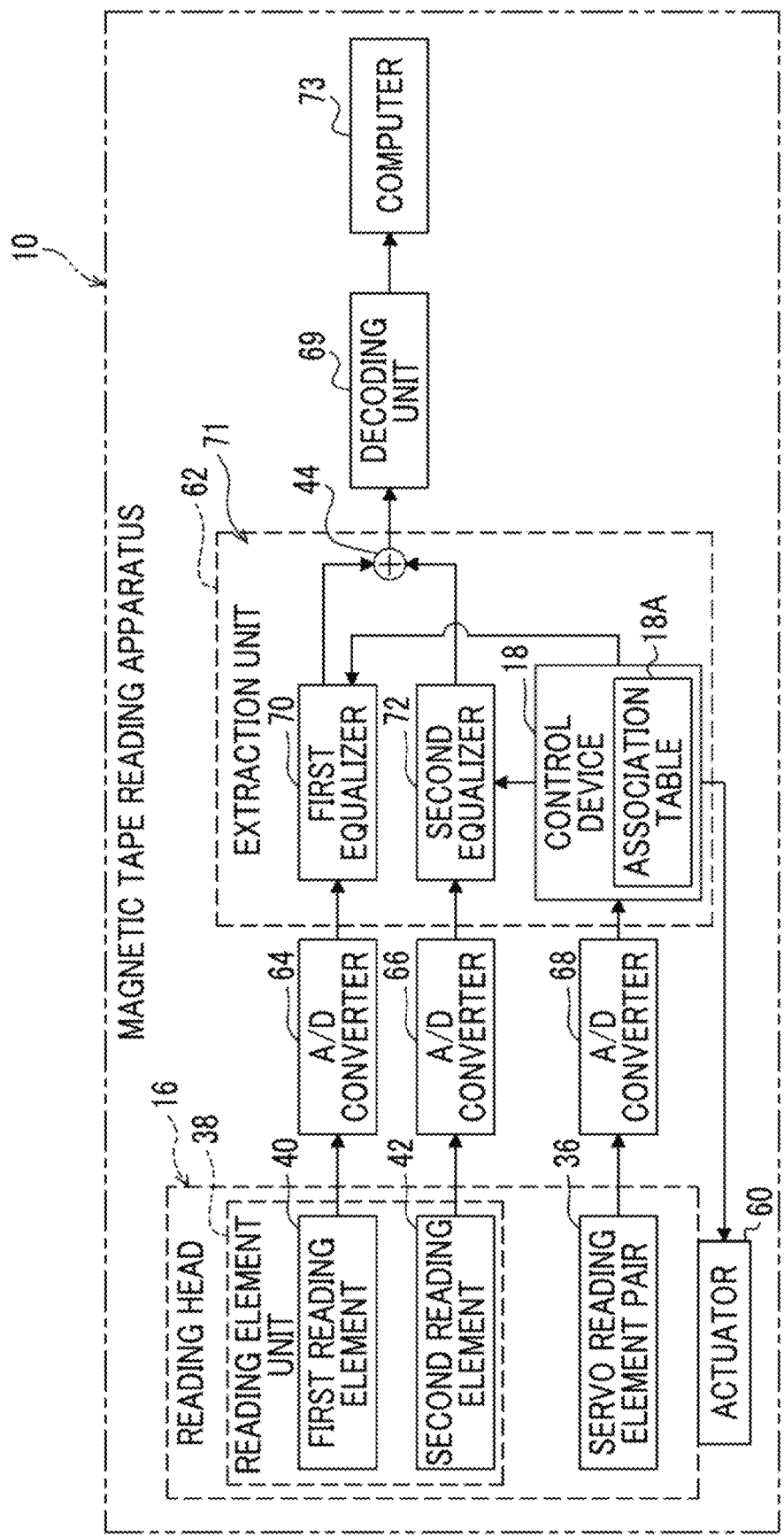
FIG. 22 is a block view showing an example of a main configuration of hardware of an electric system of the magnetic tape reading apparatus according to the embodiment.

As shown in FIG. 22 as an example, the magnetic tape reading apparatus 10 further comprises an actuator 60, an extraction unit 62, an analog/digital (A/D) converters 64, 66, and 68, a decoding unit 69, and a computer 73.

The control device 18 is connected to the servo reading element pair 36 through the A/D converter 68. The A/D converter 68 outputs a servo signal obtained by converting an analog signal obtained by reading the servo pattern 32 by the servo reading elements 36A and 36B included in the servo reading element pairs 36 into a digital signal, to the control device 18.

The control device 18 is connected to the actuator 60. The actuator 60 is attached to the reading head 16 and applies electric power to the reading head 16 under the control of the control device 18, to change the position of the reading head 16 in the tape width direction. The actuator 60, for example, includes a voice coil motor, and the electric power applied to the reading head 16 is electric power obtained by converting an electric energy based on a current flowing through the coil into a kinetic energy, using an energy of a magnet as a medium.

Here, the aspect in which the voice coil motor is loaded on the actuator 60 is described, but the technology of the present disclosure is not limited thereto, and for example, a piezoelectric element can also be used, instead of the voice coil motor. In addition, the voice coil motor and the piezoelectric element can be combined with each other.

The deviation amount between the positions of the magnetic tape MT and the reading element unit 38 is derived by the control device 18 in accordance with a read signal of the servo pattern 32 which is a result obtained by reading the servo patterns 32 by the servo reading element pair 36. The control device 18 derives the deviation amount between positions of the magnetic tape MT and the reading element unit 38 by using the read signal of the servo pattern 32 in a state where the positioning control is performed. The control device 18 is an example of the "derivation unit" according to technology of the present disclosure. The deviation amount can be generated due to steep vibrations, high-frequency components of jitter, and the like even in a state where the control device 18 controls positioning the reading element unit 38.

Here, the deviation amount between the positions of the magnetic tape MT and the reading element unit 38 is used as an example, the technology of the present disclosure is not limited thereto. For example, the deviation amount between predetermined reference positions of the servo reading element 36A and the magnetic tape MT may be used, or the deviation amount between an end surface of the reading head 16 and a center position of a specific track included in the magnetic tape MT may be used. As described above, the deviation amount corresponding to the deviation amount between the center of the reading target track 30A in the tape width direction and the center of the reading head 16 in the tape width direction may be used. Hereinafter, for convenience of description, the deviation amount between the positions of the magnetic tape MT and the reading element unit 38 is simply referred to as a "deviation amount".

For example, as shown in FIG. 23, the deviation amount is calculated based on a ratio of a distance A to a distance B. The distance A indicates a distance calculated from a result obtained by reading the first diagonal line 32A and the second diagonal line 32B adjacent to each other by the servo reading element 36A. The distance B indicates a distance calculated from a result obtained by reading two first diagonal lines 32A adjacent to each other by the servo reading element 36A.

The extraction unit 62 comprises the control device 18 and a two-dimensional finite impulse response (FIR) filter 71. The two-dimensional FIR filter 71 comprises the adder 44, the first equalizer 70, and the second equalizer 72.

The first equalizer 70 is connected to the first reading element 40 through the A/D converter 64. In addition, the first equalizer 70 is connected to each of the control device 18 and the adder 44. The data read by the first reading element 40 from the specific track region 31 is an analog signal, and the A/D converter 64 outputs a first read signal obtained by converting the data read by the first reading element 40 from the specific track region 31 into a digital signal, to the first equalizer 70.

The second equalizer 72 is connected to the second reading element 42 through the A/D converter 66. In addition, the second equalizer 72 is connected to each of the control device 18 and the adder 44. The data read by the second reading element 42 from the specific track region 31 is an analog signal, and the A/D converter 66 outputs a second read signal obtained by converting the data read by the second reading element 42 from the specific track region 31 into a digital signal, to the second equalizer 72. The first read signal and the second read signal are one example of a "reading result for each reading element" according to the technology of the present disclosure.

The first equalizer 70 performs the waveform equalization process with respect to the input first read signal. That is, the first equalizer 70 performs a convolution arithmetic operation of a tap coefficient with respect to the input first read signal, and outputs the first arithmetic operation processed signal which is a signal after the arithmetic operation.

The second equalizer 72 performs the waveform equalization process with respect to the input second read signal. That is, the second equalizer 72 performs a convolution arithmetic operation of a tap coefficient with respect to the input second read signal, and outputs the second arithmetic operation processed signal which is a signal after the arithmetic operation.

Each of the first equalizer 70 and the second equalizer 72 outputs the first arithmetic operation processed signal and the second arithmetic operation processed signal to the adder 44. The adder 44 adds and composes the first arithmetic operation processed signal input from the first equalizer 70 and the second arithmetic operation processed signal input from the second equalizer 72, and outputs the composite data obtained by the composite to the decoding unit 69.

Each of the first equalizer 70 and the second equalizer 72 is a one-dimensional FIR filter.

In the embodiment of the present disclosure, the FIR filter is a series of actual values including positive and negative values, the number of lines of the series is referred to as a tap number, and the numerical value is referred to as a tap coefficient. In addition, in the embodiment of the present disclosure, the waveform equalization indicates a process of the convolution arithmetic operation (multiplication and accumulation) of the series of actual values, that is, the tap coefficient, with respect to the read signal. The "read signal" here indicates a collective term of the first read signal and the second read signal. In the embodiment of the present disclosure, the equalizer indicates a circuit which carries out a process of performing the convolution arithmetic operation of the tap coefficient with respect to the read signal or the other input signal and outputting the signal after the arithmetic operation. In addition, in the embodiment of the present disclosure, the adder indicates a circuit which simply adds two series. The weighting of the two series is reflected on the numerical values, that is, the tap coefficient of the FIR filter used in the first equalizer 70 and the second equalizer 72.

The control device 18 performs the waveform equalization process according to the deviation amount with respect to each of the first equalizer 70 and the second equalizer 72 by setting the tap coefficient according to the deviation amount with respect to the FIR filter of each of the first equalizer 70 and the second equalizer 72.

The control device 18 comprises an association table 18A. In the association table 18A, the tap coefficient is associated with the deviation amount for each of the first equalizer 70 and the second equalizer 72. A combination of the tap coefficient and the deviation amount is, for example, a combination obtained in advance as a combination of the tap coefficient and the deviation amount, with which the best composite data is obtained by the adder 44, based on the result obtained by performing at least one of the test performed with a real machine or a simulation. The "best composite data" here indicates data corresponding to the reading target track data.

Here, the "reading target track data" indicates "data recorded on the reading target track 30A" according to the technology of the present disclosure. The "data recorded on the reading target track 30A" indicates data corresponding to data written on the reading target track 30A. As an example of the data written on the reading target track 30A, data which is read from the reading target track 30A and to which a noise component from the adjacent tracks is not mixed is used.

Here, the association table 18A is used as an example, but the technology of the present disclosure is not limited thereto, and an arithmetic expression may be used instead of the association table 18A. The "arithmetic expression" here indicates an arithmetic expression in which an independent variable is set as the deviation amount and a dependent variable is set as the tap coefficient, for example.

In the embodiment of the present disclosure, the aspect is described in which the tap coefficient is derived from the association table 18A in which combinations of the tap coefficients and the deviation amounts are regulated, but the technology of the present disclosure is not limited thereto. For example, the tap coefficient may be derived from the association table in which the combinations of tap coefficients and ratios are regulated, or the arithmetic expression. The "ratio" here indicates a ratio between an overlapping region with the reading target track 30A and an overlapping region with the adjacent track, regarding each of the first reading element 40 and the second reading element 42. The ratio is calculated and specified from the deviation amount by the control device 18 and the tap coefficient is determined in accordance with the specified ratio. In the embodiment, in the magnetic tape reading apparatus 10, it is possible to exactly reduce the noise component, even in a case where the positional relationship between the magnetic tape MT and the reading element unit 38 is changed, compared to a case where the tap coefficient is determined in accordance with a parameter with no relation with a ratio between the overlapping region with the reading target track 30A and the overlapping region with the adjacent track regarding each of the plurality of reading elements.

The decoding unit 69 decodes the composite data input from the adder 44 and outputs a decoded signal obtained by the decoding to the computer 73. The computer 73 performs various processes with respect to the decoded signal input from the decoding unit 69.

Next, a magnetic tape reading process carried out by the extraction unit 62 will be described with reference to FIG. 24, as an operation of a portion of the magnetic tape reading apparatus 10 regarding the data reading.

Hereinafter, for convenience of description, the embodiment is described based on assumption that the servo signal is input to the control device 18, in a case where a period of the sampling of data reading comes. That is, in the embodiment of the present disclosure, the track region 30 is formed in parallel with the servo pattern 32 along the running direction, and accordingly, the reading operation by the reading element unit 38 is performed synchronously with the reading operation by the servo reading element pair 36.

Figure 24:
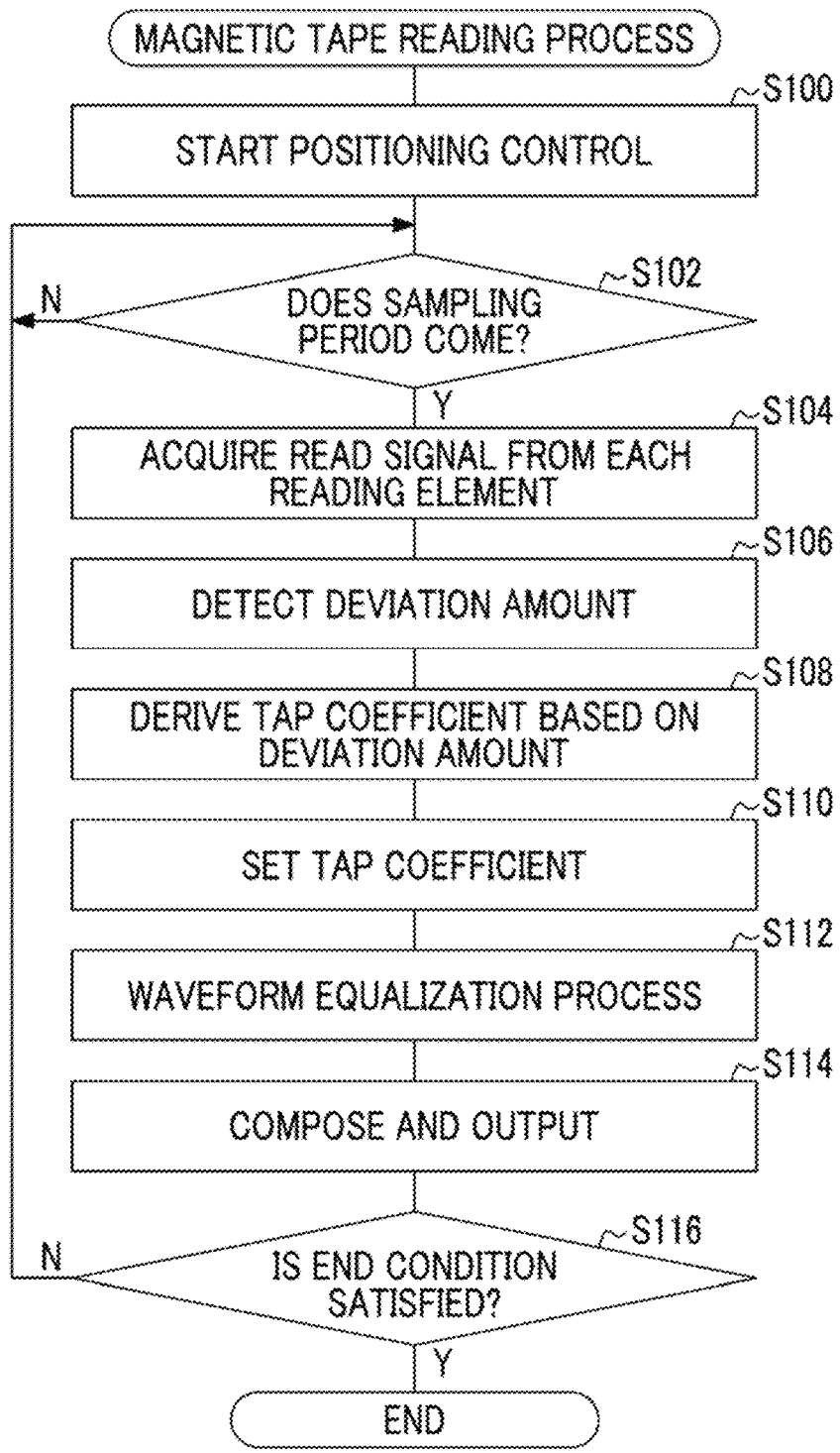
FIG. 24 is a flowchart showing an example of a flow of a magnetic tape reading process according to the embodiment.

In the process shown in FIG. 24, first, in step S100, the control device 18 starts control of positioning the reading element unit 38. The positioning control process described above (see FIG. 21) is executed by the processing of step S100. The positioning control process described above is executed for the sampling interval of the servo signal until the magnetic tape reading process ends.

In following step S102, the control device 18 determines whether or not the period of sampling of the data reading comes. In step S102, in a case where the period of the sampling comes, the determination is affirmative and the magnetic tape reading process proceeds to step S104. In step S102, in a case where the period of the sampling does not come, the determination is denied, and the determination of step S102 is performed again. In the present embodiment, a case where the sampling interval of the servo signal is longer than the sampling interval of data reading will be described. Therefore, the reading result of one servo signal by the positioning control of step S100 is used for plural times of data reading.

In step S104, the first equalizer 70 acquires the first read signal, the second equalizer 72 acquires the second read signal, and then, the magnetic tape reading process proceeds to step S106.

In step S106, the control device 18 acquires a servo signal and calculates a deviation amount from the acquired servo signal, and then the magnetic tape reading process proceeds to step S108.

In step S108, the control device 18 derives a tap coefficient corresponding to the deviation amount calculated in the processing of step S106 from the association table 18A, for each of the first equalizer 70 and the second equalizer 72. That is, by performing the processing of step S108, an optimal combination is determined as a combination of a one-dimensional FIR filter which is an example of the first equalizer 70 and a one-dimensional FIR filter which is an example of the second equalizer 72. The "optimal combination" here indicates, for example, a combination in which the composite data output by performing a processing of step S114 which will be described later is set as data corresponding to the reading target track data.

In following step S110, the control device 18 sets the tap coefficient derived in the processing of step S108 with respect to each of the first equalizer 70 and the second equalizer 72, and then the magnetic tape reading process proceeds to step S112.

In step S112, the first equalizer 70 performs the waveform equalization process with respect to the first read signal acquired in the processing of step S104, and accordingly, the first arithmetic operation processed signal is generated. The first equalizer 70 outputs the generated first arithmetic operation processed signal to the adder 44. The second equalizer 72 performs the waveform equalization process with respect to the second read signal acquired in the processing of step S104, and accordingly, the second arithmetic operation processed signal is generated. The second equalizer 72 outputs the generated second arithmetic operation processed signal to the adder 44.

Figure 25:
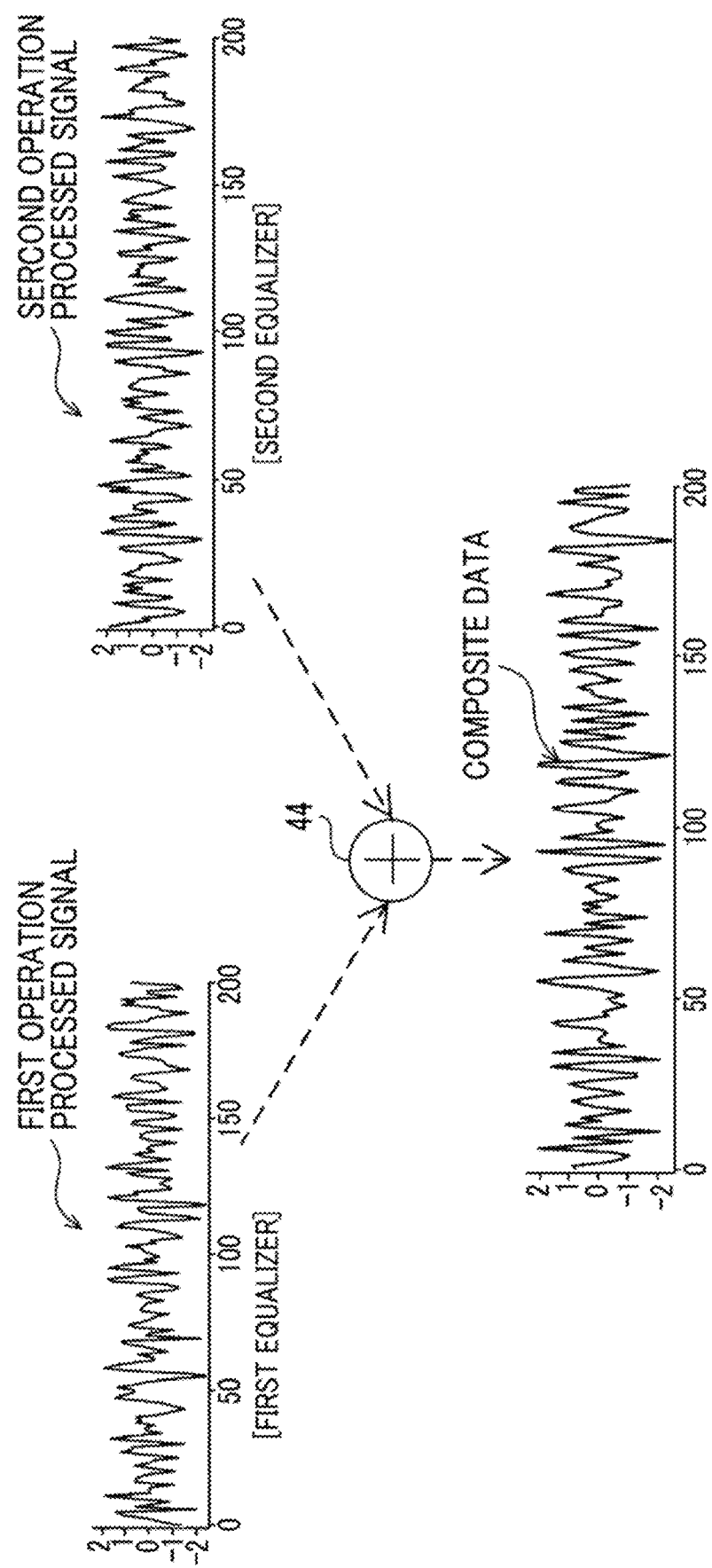
FIG. 25 is a conceptual view provided for description of a process performed by two-dimensional FIR filter of an extraction unit according to the embodiment.

In following step S114, the adder 44 adds and composes the first arithmetic operation processed signal input from the first equalizer 70 and the second arithmetic operation processed signal input from the second equalizer 72, as shown in FIG. 25 as an example. The adder 44 outputs the composite data obtained by the composite to the decoding unit 69.

In a case where the reading element unit 38 is disposed in the specific track region 31, as the example shown in FIG. 3, the data corresponding to the reading target track data, from which the noise component from the first noise mixing source track 30B is removed, is output as the composite data, by performing the processing of step S114. That is, by performing the processing of step S104 to step S114, the extraction unit 62 extracts the data recorded on the reading target track 30A.

Figure 26:
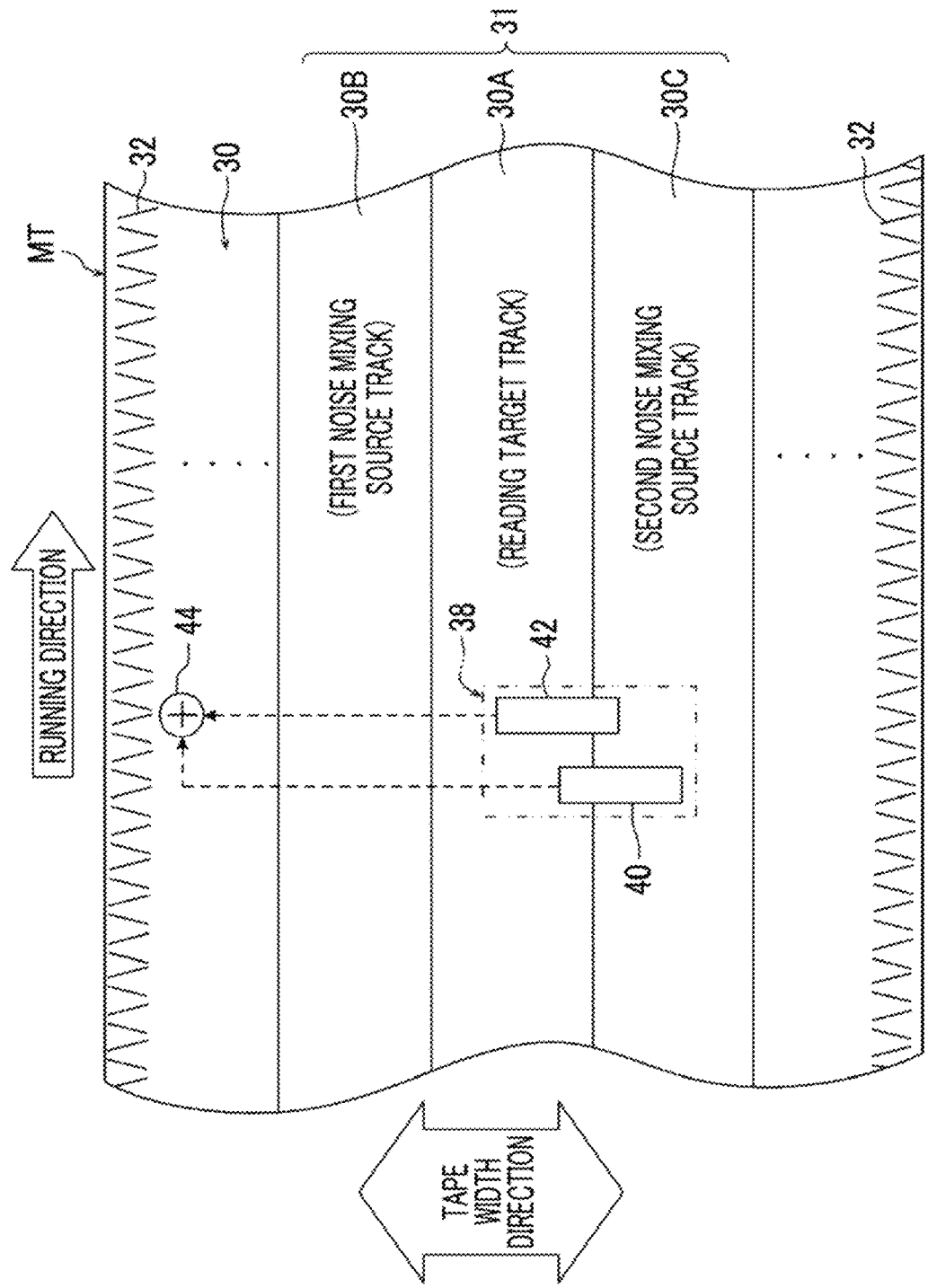
FIG. 26 is a schematic plan view showing an example of a state where the reading element unit according to the embodiment straddles over a reading target track and a second noise mixing source track.

In a case where the magnetic tape MT expands and contracts in the tape width direction or vibration is applied to at least one of the magnetic tape MT or the reading head 16, the reading element unit 38 is displaced to a position shown in FIG. 26 from the position shown in FIG. 3 as an example. In the example shown in FIG. 26, the first reading element 40 and the second reading element 42 are disposed at positions straddling over both the reading target track 30A and the second noise mixing source track 30C. In this case, by performing the processing of step S104 to step S114, the data corresponding to the reading target track data, from which the noise component from the second noise mixing source track 30C is removed, is output to the decoding unit 69 as the composite data.

In the next step S116, the control device 18 determines whether or not a condition for completing the magnetic tape reading process (hereinafter, referred to as a "completion condition") is satisfied. The completion condition indicates, for example, a condition in which the entire magnetic tape MT is wound around the winding reel 22, a condition in which an instruction for forced completion of the magnetic tape reading process is applied from the outside, and the like.

In step S116, in a case where the completion condition is not satisfied, the determination is denied, and the magnetic tape reading process proceeds to step S102. In step S116, in a case where the completion condition is satisfied, the determination is affirmative, and the magnetic tape reading process ends.

As described above, in the magnetic tape reading apparatus 10, the data from the specific track region 31 is read by each of the first reading element 40 and the second reading element 42 disposed in a state of being adjacent to each other. In addition, the extraction unit 62 performs the waveform equalization process according to the deviation amount with respect to each of the first reading element 40 and the second reading element 42, to extract the data recorded on the reading target track 30A from the first read signal and the second read signal. Therefore, in the magnetic tape reading apparatus 10, it is possible to suppress a deterioration in reliability of data read from the reading target track 30A by the linear scanning method, compared to a case where the data is read from the reading target track 30A only by a single reading element by the linear scanning method.

In the magnetic tape reading apparatus 10, parts of the first reading element 40 and the second reading element 42 overlap each other in the running direction. Therefore, in the magnetic tape reading apparatus 10, it is possible to increase reliability of data read from the reading target track 30A by the linear scanning method, compared to a case where the entire portions of the plurality of reading elements overlap in the running direction.

In the magnetic tape reading apparatus 10, the specific track region 31 is the reading target track 30A, the first noise mixing source track 30B, and the second noise mixing source track 30C, and each of the first reading element 40 and the second reading element 42 straddles over both the reading target track 30A and the adjacent track, in a case where a positional relationship with the magnetic tape MT is changed. Therefore, in the magnetic tape reading apparatus 10, it is possible to reduce the noise component generated in one of the reading element of the first reading element 40 and the second reading element 42 due to entering the adjacent track from the reading target track 30A in the tape width direction, by using the reading result obtained by the other reading element entering the adjacent track from the reading target track 30A in the tape width direction, compared to a case where the data is read by only the single reading element from the reading target track 30A by the linear scanning method.

In the magnetic tape reading apparatus 10, the tap coefficient used in the waveform equalization process is determined in accordance with the deviation amount. Therefore, in the magnetic tape reading apparatus 10, it is possible to instantaneously reduce the noise component generated due to the entering the reading target track 30A from the adjacent track in the tape width direction, in accordance with a change of the positional relationship between the magnetic tape MT and the reading element unit 38, compared to a case where the tap coefficient is determined in accordance with a parameter with no relation with the deviation amount.

In the magnetic tape reading apparatus 10, the deviation amount is determined in accordance with the result obtained by reading the servo patterns 32 by the servo reading element pair 36. Therefore, in the magnetic tape reading apparatus 10, it is possible to easily determine the deviation amount, compared to a case where the servo patterns 32 are not applied to the magnetic tape MT.

In the magnetic tape reading apparatus 10, the reading operation by the reading element unit 38 is performed synchronously with the reading operation by the servo reading element pair 36. Therefore, in the magnetic tape reading apparatus 10, it is possible to instantaneously reduce the noise component generated due to the entering the reading target track from the adjacent track in the width direction of the magnetic tape, compared to a case of a magnetic disk and a magnetic tape in a helical scanning method, in which a servo pattern and data cannot be synchronously read.

In the magnetic tape reading apparatus 10, the extraction unit 62 includes the two-dimensional FIR filter 71. Each result obtained by performing the waveform equalization process with respect to each of the first read signal and the second read signal is composed by the two-dimensional FIR filter 71, and accordingly, the data recorded on the reading target track 30A is extracted from the first read signal and the second read signal. Therefore, in the magnetic tape reading apparatus 10, it is possible to rapidly extract the data recorded on the reading target track 30A from the first read signal and the second read signal, compared to a case of using only a one-dimensional FIR filter. In addition, in the magnetic tape reading apparatus 10, it is possible to realize simple implementation due to a smaller operation amount, compared to a case of performing a matrix operation.

In the magnetic tape reading apparatus 10, the first reading element 40 and the second reading element 42 are used as a pair of reading elements according to the technology of the present disclosure. Therefore, in the magnetic tape reading apparatus 10, it is possible to contribute to miniaturization of the reading element unit 38, compared to a case of using three reading elements. By miniaturizing the reading element unit 38, the reading unit 26 and the reading head 16 can also be miniaturized. In addition, in the magnetic tape reading apparatus 10, it is possible to suppress occurrence of a situation in which the reading element units 38 adjacent to each other are in contact with each other.

In the magnetic tape reading apparatus 10, each of the plurality of reading element units 38 reads data from the corresponding reading target track 30A included in each of the plurality of specific track regions 31 by the linear scanning method. Therefore, in the magnetic tape reading apparatus 10, it is possible to rapidly complete the reading of data from the plurality of reading target tracks 30A, compared to a case where the data is read by only the single reading element unit 38 from each of the plurality of reading target tracks 30A.

In the above embodiment, in a default state of the magnetic tape reading apparatus 10, each of the first reading element 40 and the second reading element 42 are provided to straddle over both the reading target track 30A and the first noise mixing source track 30B, but the technology of the present disclosure is not limited thereto. In an example shown in FIG. 27, a reading element unit 138 is used instead of the reading element unit 38 described in the above embodiment. The reading element unit 138 comprises a first reading element 140 and a second reading element 142. In a default state of the magnetic tape reading apparatus 10, the center of the first reading element 140 in the tape width direction coincides with a center CL of the reading target track 30A in the tape width direction. In a default state of the magnetic tape reading apparatus 10, the first reading element 140 and the second reading element 142 fall within the reading target track 30A, without being protruded to the first noise mixing source track 30B and the second noise mixing source track 30C. In addition, in a default state of the magnetic tape reading apparatus 10, parts of the first reading element 140 and the second reading element 142 are provided to overlap each other in the running direction, in the same manner as the case of the first reading element 40 and the second reading element 42 described in the above embodiment.

Figure 27:
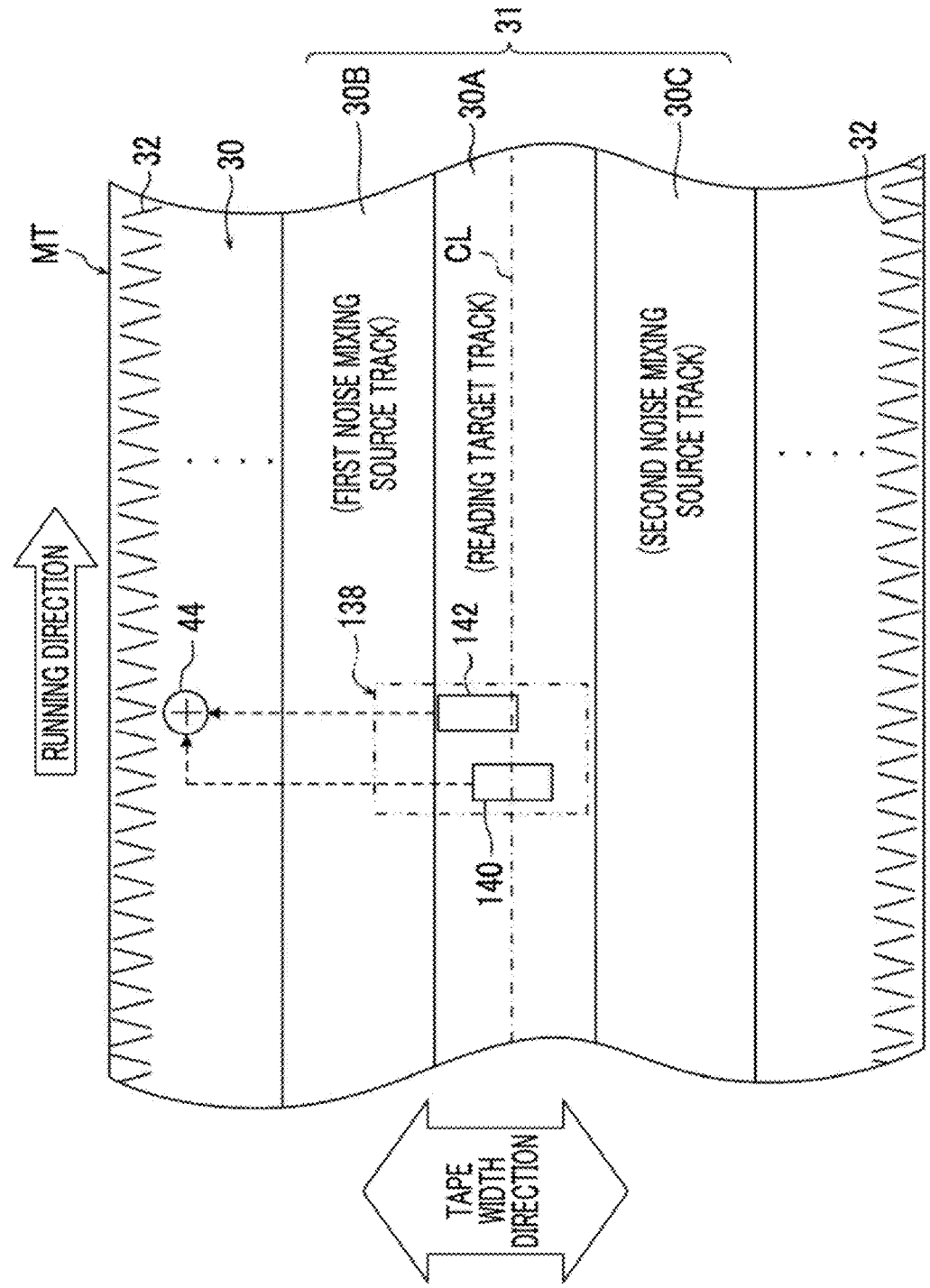
FIG. 27 is a schematic plan view showing a first modification example of the reading element unit according to the embodiment.

As shown in FIG. 27 as an example, even in a state where the first reading element 140 and the second reading element 142 face the reading target track 30A, without being protruded from the reading target track 30A, a positional relationship between the reading element unit 138 and the magnetic tape MT may be changed. That is, the reading element unit 138 may straddle over the reading target track 30A and the first noise mixing source track 30B, or the reading element unit 138 may straddle over the reading target track 30A and the second noise mixing source track 30C. Even in these cases, by performing the processing of step S104 to step S114 described above, it is possible to obtain the data corresponding to the reading target track data from which the noise component from the first noise mixing source track 30B or the second noise mixing source track 30C is removed.

In addition, parts of the first reading element 140 and the second reading element 142 are disposed at position to overlap each other in the running direction, and accordingly, the second reading element 142 can read the data from a portion of the reading target track 30A where the reading cannot be performed by the first reading element 140. As a result, it is possible to increase reliability of the reading target track data, compared to a case where the first reading element 140 singly reads the data from the reading target track 30A.

As shown in FIG. 26 as an example, in a default state of the magnetic tape reading apparatus 10, each of the first reading element 40 and the second reading element 42 may be disposed at a position to straddle over both the reading target track 30A and the second noise mixing source track 30C.

In the above embodiment, the reading element unit 38 including the first reading element 40 and the second reading element 42 is described, but the technology of the present disclosure is not limited thereto. In an example shown in FIG. 28, a reading element unit 238 is used instead of the reading element unit 38. The reading element unit 238 is different from the reading element unit 38 in a point that a third reading element 244 is included. In a default state of the magnetic tape reading apparatus 10, the third reading element 244 is disposed at a position where a part thereof overlaps a part of the first reading element 40 in the running direction. In addition, in a default state of the magnetic tape reading apparatus 10, the third reading element 244 is disposed at a position to straddle over the reading target track 30A and the second noise mixing source track 30C. Stated another way, the reading element unit need only include at least two reading elements.

In this case, a third equalizer (not shown) is also allocated to the third reading element 244, in the same manner as that the first equalizer 70 is allocated to the first reading element 40 and the second equalizer 72 is allocated to the second reading element 42. The third equalizer also has the same function as that of the first equalizer 70 and the second equalizer 72 described in the above embodiment, and performs a waveform equalization process with respect to a third read signal obtained by reading performed by the third reading element 244. The third equalizer performs a convolution arithmetic operation of a tap coefficient with respect to the third read signal and outputs the third arithmetic operation processed signal which is a signal after the arithmetic operation. The adder 44 adds and composes a first arithmetic operation processed signal corresponding to the first read signal, a second arithmetic operation processed signal corresponding to the second read signal, the third arithmetic operation processed signal corresponding to the third read signal, and outputs the composite data obtained by the composite to the decoding unit 69.

Figure 28:
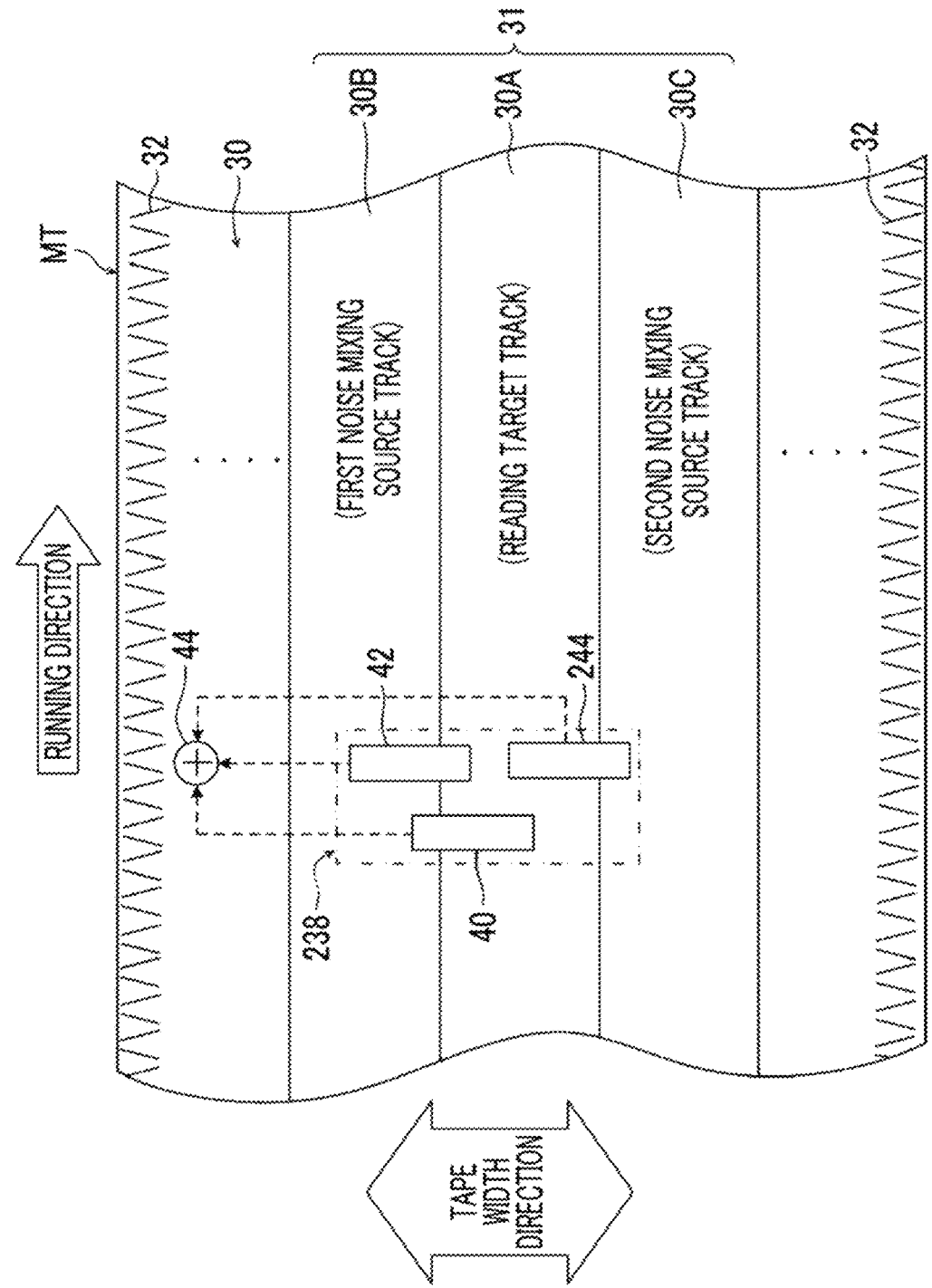
FIG. 28 is a schematic plan view showing a second modification example of the reading element unit according to the embodiment.

In the example shown in FIG. 28, in a default state of the magnetic tape reading apparatus 10, the third reading element 244 is disposed at the position straddling over the reading target track 30A and the second noise mixing source track 30C, but the technology of the present disclosure is not limited thereto. In a default state of the magnetic tape reading apparatus 10, the third reading element 244 may be disposed at the position facing the reading target track 30A, without being protruded from the reading target track 30A.

Figure 29:
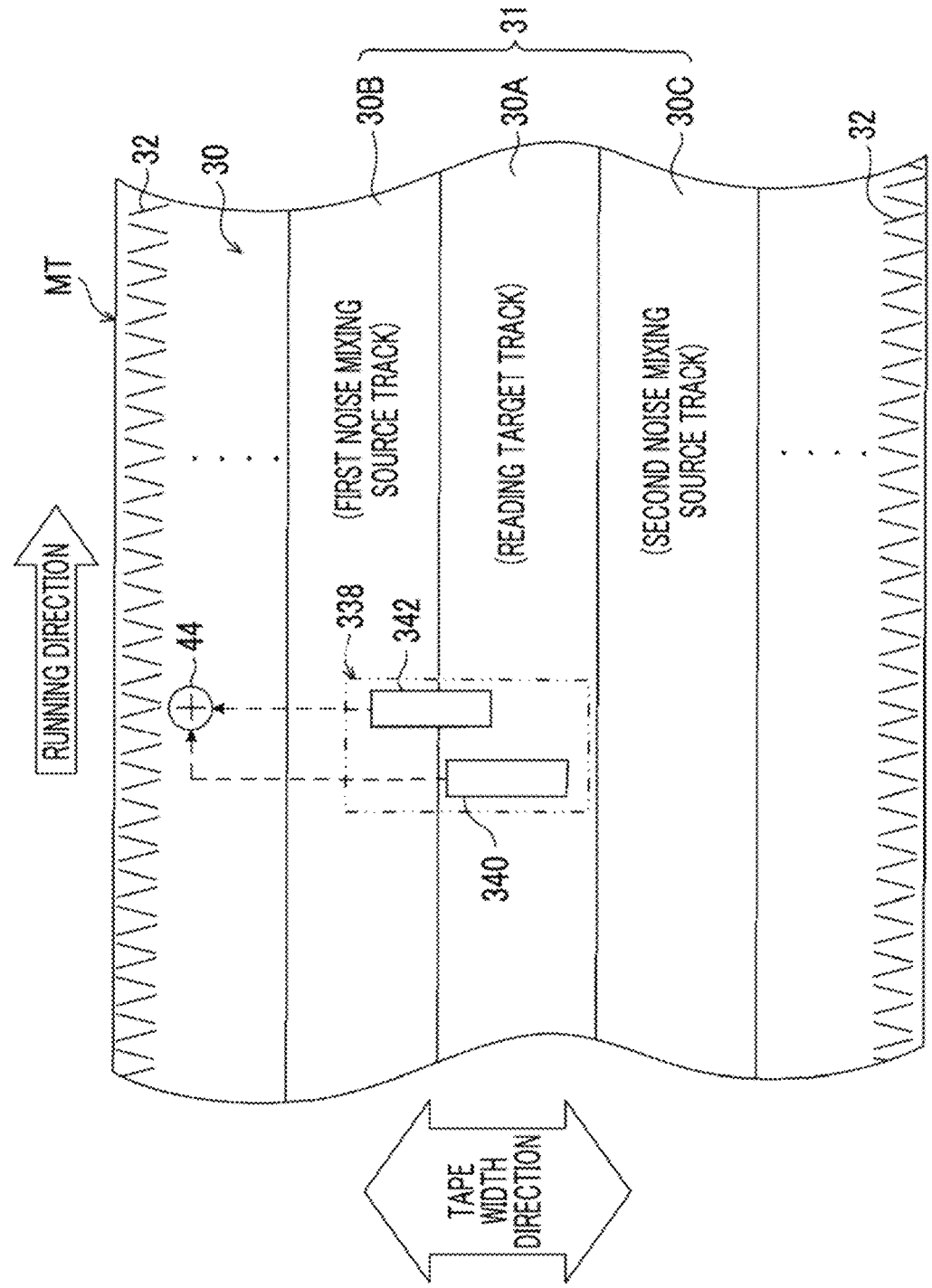
FIG. 29 is a schematic plan view showing a third modification example of the reading element unit according to the embodiment.
Figure 30:
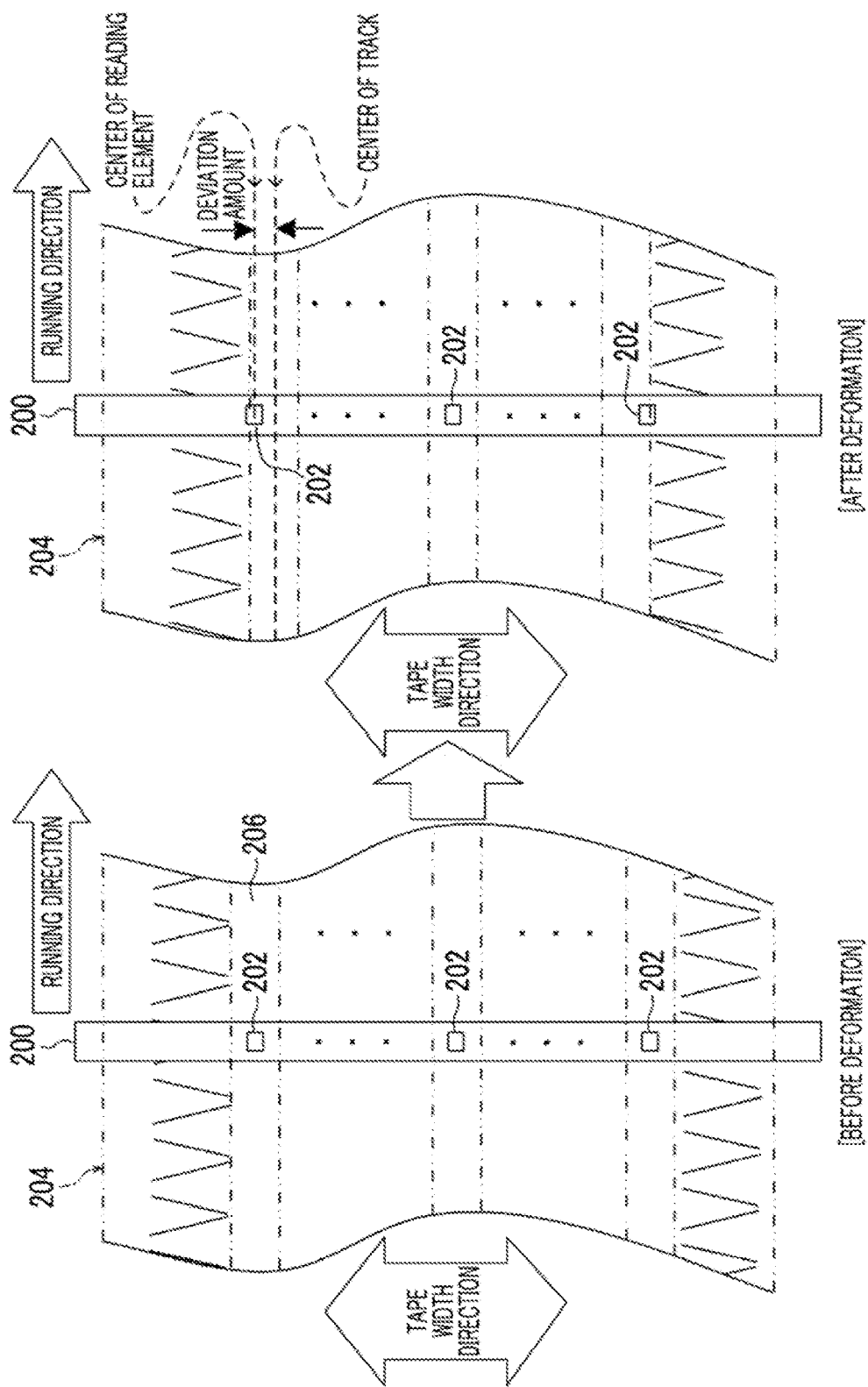
FIG. 30 is a conceptual view provided for description of a first example of the related art.
Figure 31:
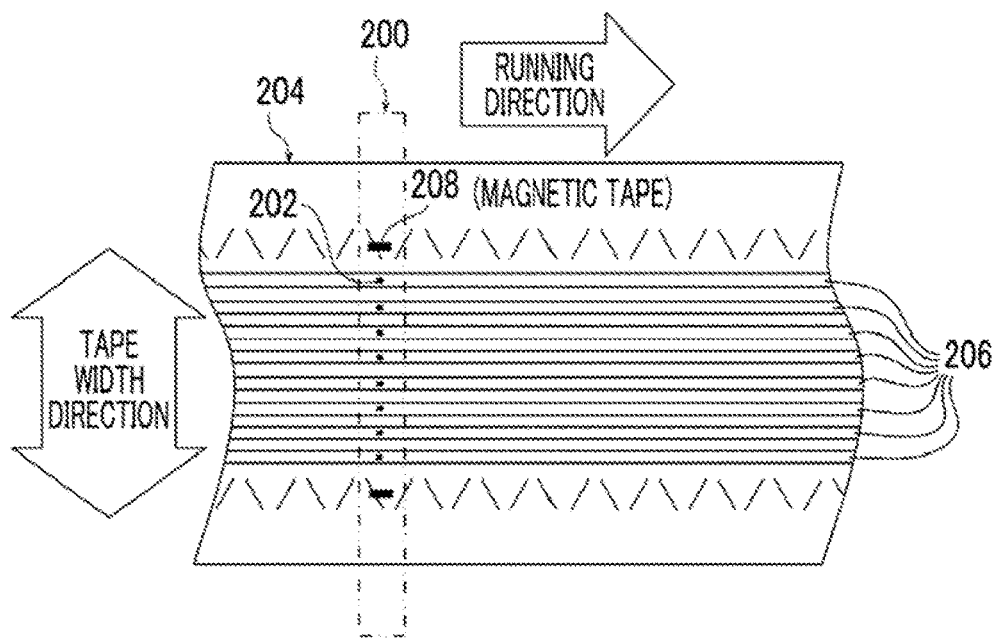
FIG. 31 is a conceptual view provided for description of a second example of the related art.

In the above embodiment, in a default state of the magnetic tape reading apparatus 10, each of the first reading element 40 and the second reading element 42 are provided to straddle over both the reading target track 30A and the first noise mixing source track 30B. However, the technology of the present disclosure is not limited thereto. In a case where a positional relationship with the magnetic tape is changed, at least one reading element among at least two reading elements may straddle over both the reading target track and the adjacent track, and at least the other one reading element may fall within the reading target track. For example, in the reading element unit 338 shown in FIG. 29, among the first reading element 340 and the second reading element 342, the second reading element 342 straddles over both the reading target track 30A and the first noise mixing source track 30B, but the first reading element 340 falls within the reading target track 30A. Even in this case, by performing the processing of step S104 to step S114 described above, it is possible to obtain the data corresponding to the reading target track data from which the noise component from the first noise mixing source track 30B is removed.

In the above embodiment, the reading element unit 38 is described, but the technology of the present disclosure is not limited thereto. For example, the reading element pair 50 shown in FIG. 4 may be used instead of the reading element unit 38. In this case, the first reading element 50A and the second reading element 50B are set to be disposed at positions adjacent to each other in the tape width direction. In addition, the first reading element 50A and the second reading element 50B are set to be disposed in a line in the tape width direction so that the SNR is higher than the SNR of the single reading element data item over the entire range of the track off-set, as shown in FIG. 6 as an example, without being in contact with each other.

In the example shown in FIG. 4, for example, the first reading element 50A falls within the second track 49B in a plan view, and the second reading element 50B falls within the first track 49A in a plan view.

In the above embodiment, the servo reading element pair 36 is described, but the technology of the present disclosure is not limited thereto, and for example, one of the servo reading elements 36A and 36B may be used instead of the servo reading element pair 36.

In the above embodiment, the aspect in which the plurality of specific track regions 31 are arranged in the track region 30 at regular intervals in the tape width direction is described, but the technology of the present disclosure is not limited thereto. For example, in two specific track regions 31 adjacent to each other among the plurality of specific track regions 31, one specific track region 31 and the other specific track region 31 may be arranged in the tape width direction so as to overlap each other by the area of one track in the tape width direction. That is, in this case, one adjacent track included in one specific track region 31 (for example, the first noise mixing source track 30B) is the reading target track 30A in the other specific track region 31. In addition, the reading target track 30A included in one specific track region 31 is the adjacent track region (for example, the second noise mixing source track 30C) in the other specific track region 31.

In the above embodiment, the control device 18 may derive the deviation amount by further using the servo pattern distance information 114 in addition to the read signal of the servo pattern 32. In this case, the control device 18 derives the deviation amount from the distance A shown in FIG. 23 and the distance stored in the servo pattern distance information 114 in association with the servo band SB which is a reading target.

In the above embodiment, the servo pattern distance information 114 obtained by measuring the gap pattern G of the servo recording head WH to control the positioning of the reading element unit 38, the technology of the present disclosure is not limited thereto. For example, predetermined interval data between the first diagonal line and the second diagonal line of the servo pattern may be used instead of the servo pattern distance information 114. As described above, even in a case where the default interval data is used, by using the servo pattern distance information 114 in a case of deriving the deviation amount, it is possible to suppress a decrease in reliability of data read from the magnetic tape.

In the above embodiment, a case where the servo pattern distance information 114 is recorded on the RFID tag 122 is described, but the technology of the present disclosure is not limited thereto. For example, the servo pattern distance information 114 may be repeatedly recorded across the head portion or entire length of the track region 30 or the servo band SB of the magnetic tape MT, and may be recorded on the barcode recorded on a predetermined position of the outer peripheral surface of the case of the magnetic tape cartridge 12. Also, the servo pattern distance information 114 may be recorded on the two-dimensional code such as a QR code (registered trademark) recorded on a predetermined position of the outer peripheral surface of the case.

In the above embodiment, the control device 18 may store the servo pattern distance information 114 read from the RFID tag 122 in the storage unit (not shown) in association with the identification information of the magnetic tape cartridge 12. In this case, an aspect in which the identification information of the magnetic tape cartridge 12 is stored in the RFID tag 122 and is read from the RFID tag 122 is exemplified. Also, in this case, an aspect in which in a case of using the magnetic tape cartridge 12 on which the corresponding servo pattern distance information 114 is stored in the storage unit, the control device 18 positions the reading element unit 38 by using the servo pattern distance information 114 stored in the storage unit is exemplified. For example, a control unit having a storage unit may be provided in the tape library 162, and the servo pattern distance information 114 read from the RFID tag 122 is stored in the storage unit included in the control unit.

In the above embodiment, instead of the servo pattern distance information 114, information on another linearity of the gap pattern G of the servo recording head WH measured by the measuring device 130 (for example, image information including the gap pattern G or coordinate information of the gap pattern G in the image) may be recorded on the RFID tag 122 or the storage unit. In this case, an aspect in which in a case of using the magnetic tape cartridge 12, the control device 18 generates distance information based on the information recorded on the RFID tag 122 or the storage unit is exemplified.

In the above embodiment, instead of the servo pattern distance information 114, the identification information such as a manufacturing number of the servo recording head WH which is a measurement target of the measuring device 130 may be recorded on the RFID tag 122. In this case, an aspect in which a database including the manufacturing number of the servo recording head WH and the distance information being associated with each other is stored in advance in the storage unit of the control device 18 is exemplified. Further, in this case, an aspect in which in a case of using the magnetic tape cartridge 12, the control device 18 acquires the distance information from the database recorded on the storage unit by using the identification information stored in the RFID tag 122 is exemplified. For example, a control unit including a storage unit may be provided in the tape library 162, and the database may be stored in the storage unit included in the control unit.

In the above embodiment, instead of the servo pattern distance information 114, the information represented in a form of arithmetic expression obtained by approximating the shape of the portion of the gap pattern G of the servo recording head WH that records the first diagonal line 32A and the shape of the portion thereof that records the second diagonal line 32B may be recorded on the RFID tag 122. In this case, an aspect in which the control device 18 derives the distance corresponding to each servo position by using the information represented in a form of arithmetic expression is exemplified.

In the above embodiment, a case where the RFID tag 122 is adopted as the recording medium being capable of reading the recorded information in a non-contact manner is described, but the technology of the present disclosure is not limited thereto. For example, a memory card equipped with a wireless communication function may be adopted as the recording medium being capable of reading the recorded information in a non-contact manner.

In the above embodiment, a case where a passive RFID tag is adopted as the RFID tag 122 is described, but the technology of the present disclosure is not limited thereto. For example, a RFID tag of a method of transmitting radio waves (so-called an active method) may be adopted as the RFID tag 122.

In the above embodiment, a case where the information on the linearity of the gap pattern G of the servo recording head WH is measured is described, but the technology of the present disclosure is not limited thereto. Information on the linearity of the first diagonal line 32A and the second diagonal line 32B recorded on the servo band SB of the magnetic tape MT may be measured. In this case, the information on the linearity of one set of the first diagonal line 32A and the second diagonal line 32B may be measured, and the information on the linearity of a plurality of sets of the first diagonal line 32A and the second diagonal line 32B may be measured and averaged.

The magnetic tape reading process described in the above embodiment is merely an example. Accordingly, unnecessary steps may be removed, new steps may be added, and the process procedure may be changed, within a range not departing from the gist.

In a case where all of documents, patent applications, and technical standard described in the specification are incorporated in the specification as references, each of documents, patent applications, and technical standard is incorporated in the specification by references specifically and to the same degree as a case where the incorporation of each of documents, patent applications, and technical standard as references is and individually noted.

What is claimed is:

1. A magnetic tape reading apparatus, comprising:
a processor;
a reading element unit; and
a servo reading element, wherein:
the processor acquires, from a magnetic tape cartridge, information related to linearity of a servo pattern to be recorded on a servo band of a magnetic tape included in the magnetic tape cartridge,
the reading element unit includes at least two reading elements that are adjacent to each other,
each of the at least two reading elements reads data by a linear scanning method from a specific track region including a reading target track in a track region included in the magnetic tape,
the servo reading element reads the servo pattern, and
the processor:
performs control of positioning the reading element unit by using a read signal of the servo pattern read by the servo reading element and the acquired information related to linearity,
derives a deviation amount between positions of the magnetic tape and the reading element unit by using the read signal of the servo pattern in a state of performing the control, and
extracts data recorded on the reading target track from a reading result by performing a waveform equalization process on each reading result of the at least two reading elements in accordance with the derived deviation amount.

2. A magnetic tape reading apparatus, comprising:
a processor;
a reading element unit; and
a servo reading element, wherein:
the processor acquires, from a magnetic tape cartridge, information related to linearity of a servo pattern to be recorded on a servo band of a magnetic tape included in the magnetic tape cartridge,
the reading element unit includes at least two reading elements that are adjacent to each other,
each of the at least two reading elements reads data by a linear scanning method from a specific track region including a reading target track in a track region included in the magnetic tape,
the servo reading element reads the servo pattern, and
the processor:
performs control of positioning the reading element unit by using a read signal of the servo pattern read by the servo reading element,
derives a deviation amount between positions of the magnetic tape and the reading element unit by using the read signal of the servo pattern and the acquired information related to linearity, in a state of performing the control, and
extracts data recorded on the reading target track from a reading result by performing a waveform equalization process on each reading result of the at least two reading elements in accordance with the derived deviation amount.

3. The magnetic tape reading apparatus according to claim 1, wherein the processor derives the deviation amount by using the information related to linearity in addition to the read signal of the servo pattern.

4. The magnetic tape reading apparatus according to claim 2, wherein the processor performs the control of positioning the reading element unit by using the information related to the linearity in addition to the read signal of the servo pattern.

5. The magnetic tape reading apparatus according to claim 1,
wherein the specific track region is a region including the reading target track and an adjacent track that is adjacent to the reading target track, and
in a case in which a positional relationship with the magnetic tape is changed, at least one reading element of the at least two reading elements extends over both the reading target track and the adjacent track, and at least one other reading element of the at least two reading elements falls within the reading target track.

6. The magnetic tape reading apparatus according to claim 1, wherein respective parts of the at least two reading elements overlap with each other in a running direction of the magnetic tape.

7. The magnetic tape reading apparatus according to claim 6,
wherein the specific track region is a region including the reading target track and an adjacent track that is adjacent to the reading target track, and
in a case in which a positional relationship with the magnetic tape is changed, the at least two reading elements extend over both the reading target track and the adjacent track.

8. The magnetic tape reading apparatus according to claim 1, wherein a tap coefficient used in the waveform equalization process is determined in accordance with the deviation amount.

9. The magnetic tape reading apparatus according to claim 8, wherein the processor derives the tap coefficient based on the deviation amount by using a table in which the tap coefficient and the deviation amount are associated with each other.

10. The magnetic tape reading apparatus according to claim 8, wherein for each of the at least two reading elements, a ratio between an overlapping region with the reading target track and an overlapping region with an adjacent track that is adjacent to the reading target track is specified based on the deviation amount, and the tap coefficient is determined in accordance with the specified ratio.

11. The magnetic tape reading apparatus according to claim 1, wherein the information related to linearity of the servo pattern is information related to linearity of a servo recording element of a servo recording head that records the servo pattern on the magnetic tape.

12. The magnetic tape reading apparatus according to claim 1, wherein the information related to the linearity of the servo pattern is recorded in a format of a table or arithmetic expression.

13. A magnetic tape reading method using a reading element unit in which at least two reading elements are adjacent to each other, the method comprising:
- acquiring, by processor, information, recorded on a recording medium included in a magnetic tape cartridge, related to linearity of a servo pattern to be recorded on a servo band of a magnetic tape included in the magnetic tape cartridge;
- reading, by a servo reading element, the servo pattern;
- positioning, by the processor, the reading element unit by using a read signal of the servo pattern and the information related to the linearity;
- deriving, by the processor, a deviation amount between positions of the magnetic tape and the reading element unit by using the read signal of the servo pattern, in a state of performing control of the positioning;
- reading, by each of the at least two reading elements, data from a specific track region including a reading target track in a track region included in the magnetic tape by a linear scanning method; and
- extracting, by the processor, data recorded on the reading target track from a reading result by performing a waveform equalization process on each reading result of the at least two reading elements in accordance with the derived deviation amount.

14. A magnetic tape reading method using a reading element unit in which at least two reading elements are adjacent to each other, the method comprising:
- acquiring, by a processor, information, recorded on a recording medium included in a magnetic tape cartridge, related to linearity of a servo pattern to be recorded on a servo band of a magnetic tape included in the magnetic tape cartridge;
- reading, by a servo reading element, the servo pattern;
- positioning, by the processor, the reading element unit by using a read signal of the servo pattern;
- deriving, by the processor, a deviation amount between positions of the magnetic tape and the reading element unit by using the read signal of the servo pattern and the information related to the linearity, in a state of performing control of the positioning;
- reading, by each of the at least two reading elements, data from a specific track region including a reading target track in a track region included in the magnetic tape by a linear scanning method; and
- extracting, by the processor, data recorded on the reading target track from a reading result by performing a waveform equalization process on each reading result of the at least two reading elements in accordance with the derived deviation amount.

* * * * *